(12) United States Patent
Oh et al.

(10) Patent No.: US 9,071,994 B2
(45) Date of Patent: Jun. 30, 2015

(54) APPARATUS AND METHOD FOR RELAYING MULTIPLE LINKS IN A COMMUNICATION SYSTEM

(75) Inventors: Seong-Keun Oh, Gyeonggi-do (KR); Min Lee, Seoul (KR)

(73) Assignee: AJOU UNIVERSITY INDUSTRY-ACADEMIC COOPERATION FOUNDATION, Suwon-Si (KR)

( * ) Notice: Subject to any disclaimer, the term of this patent is extended or adjusted under 35 U.S.C. 154(b) by 901 days.

(21) Appl. No.: 13/147,243

(22) PCT Filed: Feb. 2, 2010

(86) PCT No.: PCT/KR2010/000641
§ 371 (c)(1),
(2), (4) Date: Aug. 1, 2011

(87) PCT Pub. No.: WO2010/087687
PCT Pub. Date: Aug. 5, 2010

(65) Prior Publication Data
US 2011/0312267 A1 Dec. 22, 2011

(30) Foreign Application Priority Data

Feb. 2, 2009 (KR) .................. 10-2009-0008187
Jan. 29, 2010 (KR) .................. 10-2010-0008792

(51) Int. Cl.
*H04W 72/04* (2009.01)
*H04W 28/08* (2009.01)
(Continued)

(52) U.S. Cl.
CPC .............. *H04W 28/08* (2013.01); *H04B 7/155* (2013.01); *H04W 84/047* (2013.01)

(58) Field of Classification Search
CPC ..... H04B 7/2606; H04W 88/04; H04W 80/24
USPC ......................................... 455/7, 16
See application file for complete search history.

(56) References Cited

U.S. PATENT DOCUMENTS 6,122,218 A * 9/2000 Kang .................. 365/230.05
6,684,062 B1 * 1/2004 Gosior et al. .................. 455/73
(Continued)

FOREIGN PATENT DOCUMENTS

CN 1399818 A 2/2003
CN 101072065 A 11/2007
(Continued)

OTHER PUBLICATIONS

Falconer, David D., et al.; "Relay-Based Deployment Concepts for Wireless and Mobile Broadband Radio;" IEEE Comm. Mag., Wireless World Research Forum; Sep. 2004.
(Continued)

*Primary Examiner* — Hai V Nguyen
(74) *Attorney, Agent, or Firm* — Stein IP, LLC

(57) ABSTRACT

An apparatus and method for transmitting and receiving control data and user data between multiple communication stations using multiple backhaul links in a communication system, in which a Multi-Link Relay Station (MLRS) generates multiple backhaul links for data transmission/reception between multiple communication stations, and provides a multi-homing service for mobile stations using the generated multiple backhaul links. The MLRS may also support a handover for mobile stations using the multiple backhaul links. The use of multiple backhaul links facilitates efficient transmission/reception of control data and/or user data between multiple base stations or multiple relay stations.

20 Claims, 25 Drawing Sheets

(51) Int. Cl.
*H04B 7/155* (2006.01)
*H04W 84/04* (2009.01)

(56) References Cited

U.S. PATENT DOCUMENTS

| | | | |
|---|---|---|---|
| 7,095,722 B1* | 8/2006 | Walke et al. | 370/315 |
| 7,135,836 B2* | 11/2006 | Kutkut et al. | 320/116 |
| 7,146,452 B2* | 12/2006 | Brocco et al. | 710/312 |
| 7,242,942 B2* | 7/2007 | Kunihiro | 455/444 |
| 7,248,841 B2* | 7/2007 | Agee et al. | 455/101 |
| 7,606,156 B2* | 10/2009 | DeLangis | 370/235 |
| 7,620,003 B2* | 11/2009 | Ramachandran | 370/315 |
| 7,873,002 B2* | 1/2011 | Cai | 370/329 |
| 7,899,435 B2* | 3/2011 | Yano | 455/343.3 |
| 7,952,988 B2* | 5/2011 | Lee et al. | 370/208 |
| 8,040,826 B2* | 10/2011 | Lee et al. | 370/293 |
| 8,050,311 B2* | 11/2011 | Larsson | 375/211 |
| 8,107,962 B2* | 1/2012 | Parmar et al. | 455/437 |
| 8,111,611 B2* | 2/2012 | Kapoor et al. | 370/216 |
| 8,116,256 B2* | 2/2012 | Zhu et al. | 370/324 |
| 8,132,249 B2* | 3/2012 | Bichot et al. | 726/12 |
| 8,155,013 B2* | 4/2012 | Jeong et al. | 370/248 |
| 8,165,521 B2* | 4/2012 | Kim et al. | 455/7 |
| 8,203,966 B2* | 6/2012 | Wang et al. | 370/254 |
| 8,228,801 B2* | 7/2012 | Delangis | 370/235 |
| 8,239,719 B2* | 8/2012 | Shen et al. | 714/748 |
| 8,248,966 B2* | 8/2012 | Kim et al. | 370/254 |
| 8,285,296 B2* | 10/2012 | Cai | 455/450 |
| 8,451,928 B2* | 5/2013 | Agee et al. | 375/267 |
| 8,477,790 B2* | 7/2013 | Shin et al. | 370/400 |
| 8,483,222 B1* | 7/2013 | Ofelt et al. | 370/394 |
| 8,498,331 B2* | 7/2013 | Kato et al. | 375/240.01 |
| 8,509,681 B2* | 8/2013 | Noh et al. | 455/7 |
| 8,553,607 B2* | 10/2013 | Okuda | 370/315 |
| 8,576,753 B2* | 11/2013 | Senarath et al. | 370/279 |
| 8,582,493 B2* | 11/2013 | Li et al. | 370/315 |
| 8,711,768 B2* | 4/2014 | Viswanath | 370/328 |
| 8,724,538 B2* | 5/2014 | Nakata | 370/315 |
| 8,855,553 B2* | 10/2014 | Duerksen | 455/13.1 |
| 2002/0173310 A1* | 11/2002 | Ebata et al. | 455/445 |
| 2003/0223424 A1* | 12/2003 | Anderson et al. | 370/392 |
| 2006/0253526 A1* | 11/2006 | Welch et al. | 709/200 |
| 2007/0060050 A1* | 3/2007 | Lee et al. | 455/13.1 |
| 2007/0081502 A1* | 4/2007 | Lee et al. | 370/337 |
| 2007/0087691 A1* | 4/2007 | Lee et al. | 455/13.2 |
| 2007/0104148 A1* | 5/2007 | Kang et al. | 370/331 |
| 2007/0133388 A1* | 6/2007 | Lee et al. | 370/206 |
| 2007/0155315 A1* | 7/2007 | Lee et al. | 455/11.1 |
| 2007/0190934 A1* | 8/2007 | Kim et al. | 455/7 |
| 2007/0201411 A1* | 8/2007 | Behroozi | 370/338 |
| 2007/0281613 A1* | 12/2007 | Lee et al. | 455/15 |
| 2008/0002631 A1* | 1/2008 | Ramachandran | 370/338 |
| 2008/0039013 A1* | 2/2008 | Chang et al. | 455/11.1 |
| 2008/0045143 A1* | 2/2008 | Yoshida et al. | 455/7 |
| 2008/0080436 A1* | 4/2008 | Sandhu et al. | 370/338 |
| 2008/0107044 A1* | 5/2008 | Blair et al. | 370/256 |
| 2008/0107062 A1* | 5/2008 | Viorel et al. | 370/315 |
| 2008/0107078 A1* | 5/2008 | Viorel et al. | 370/331 |
| 2008/0125125 A1* | 5/2008 | Choi et al. | 455/436 |
| 2008/0159229 A1* | 7/2008 | Kim | 370/331 |
| 2008/0171551 A1* | 7/2008 | Zhu et al. | 455/450 |
| 2008/0186899 A1* | 8/2008 | Zhu et al. | 370/315 |
| 2008/0188231 A1* | 8/2008 | Zhu et al. | 455/450 |
| 2008/0207117 A1* | 8/2008 | Lim et al. | 455/9 |
| 2008/0219365 A1* | 9/2008 | Viorel et al. | 375/260 |
| 2008/0227457 A1* | 9/2008 | Wu | 455/437 |
| 2008/0232296 A1* | 9/2008 | Shin et al. | 370/315 |
| 2008/0287131 A1* | 11/2008 | Ju et al. | 455/439 |
| 2009/0075588 A1* | 3/2009 | Zhu et al. | 455/18 |
| 2009/0088164 A1* | 4/2009 | Shen et al. | 455/436 |
| 2009/0111470 A1* | 4/2009 | Thakare | 455/436 |
| 2009/0175214 A1* | 7/2009 | Sfar et al. | 370/315 |
| 2009/0181694 A1* | 7/2009 | Byun et al. | 455/453 |
| 2009/0274088 A1* | 11/2009 | Payyappilly et al. | 370/315 |
| 2009/0310515 A1* | 12/2009 | Wang et al. | 370/254 |
| 2010/0002656 A1* | 1/2010 | Ji et al. | 370/336 |
| 2010/0034135 A1* | 2/2010 | Kim et al. | 370/315 |
| 2010/0159825 A1* | 6/2010 | Kang et al. | 455/11.1 |
| 2010/0202343 A1* | 8/2010 | Hunzinger et al. | 370/315 |
| 2010/0265880 A1* | 10/2010 | Rautiola et al. | 370/328 |
| 2010/0279600 A1* | 11/2010 | Noh et al. | 455/7 |
| 2010/0322141 A1* | 12/2010 | Liu et al. | 370/315 |
| 2011/0086653 A1* | 4/2011 | Zhu et al. | 455/501 |
| 2011/0122812 A1* | 5/2011 | Jeong et al. | 370/328 |
| 2011/0134752 A1* | 6/2011 | Prestor et al. | 370/230.1 |
| 2011/0207397 A1* | 8/2011 | Wang et al. | 455/7 |
| 2011/0222428 A1* | 9/2011 | Charbit et al. | 370/252 |
| 2011/0223854 A1* | 9/2011 | Dottling et al. | 455/7 |
| 2013/0094432 A1* | 4/2013 | Cai | 370/315 |

FOREIGN PATENT DOCUMENTS

| | | |
|---|---|---|
| KR | 2006-0097497 | 9/2006 |
| KR | 2007-0072984 | 7/2007 |
| KR | 2008-0086072 | 9/2008 |
| KR | 2009-0090235 | 8/2009 |

OTHER PUBLICATIONS

Lee, Myung J., et al.; "Emerging Standards for Wireless Mesh Technology;" IEEE Wireless Communications; Wireless Mesh Networking; Apr. 2006.

Erwu, Liu, et al.; "Performance Evaluation of Bandwidth Allocation in 802.16j Mobile Multi-hop Relay Networks;" IEEE 2007 VTC-Spring; Apr. 22-25, 2007.

* cited by examiner

⚡ — WIRELESS B/H LINK    ⚡ — WIRELESS DIRECT LINK

⚡ — WIRELESS B/H LINK

⚡ WIRELESS DIRECT LINK

APPARATUS AND METHOD FOR RELAYING MULTIPLE LINKS IN A COMMUNICATION SYSTEM

This application makes reference to and claims all benefits from an application entitled APPARATUS AND METHOD FOR RELAYING MULTIPLE LINKS IN A COMMUNICATION SYSTEM filed in the Korean Intellectual Property Office on Feb. 2, 2010 and there duly assigned Ser. No. PCT/KR2010/000641, which in turn claims a priority to an earlier Korean Patent Application No. 10-2009-0008187 Filed on Feb. 2, 2009 and Korean Patent Application 10-2010-0008792 filed on Jan. 29, 2010.

BACKGROUND ART

Next-generation communication systems have developed to offer a variety of high-speed, high-capacity services to Mobile Stations (MSs). In particular, the next-generation communication systems consider using a multi-hop relay scheme for a variety of reasons such as the expansion of Base Station (BS) coverage and the increase in BS capacity. In other words, the next-generation communication systems consider using the multi-hop relay scheme because this scheme may be efficiently applied to the change in wireless network environments and may actively cope with the change in network environments such as addition of BSs.

The next-generation communication systems now consider only the scheme of relaying signals using a single backhaul link. In other words, the next-generation communication systems now consider only the Relay Stations (RSs) that relay signals using a single backhaul link. However, transmitting/receiving control data and user data between multiple BSs or multiple RSs using a single backhaul link decreases in its efficiency due to many restrictions.

Hence, there is a need for a scheme of efficiently transmitting/receiving control data and user data between multiple BSs or multiple RSs using multiple backhaul links.

DISCLOSURE

Technical Problem

An aspect of the present invention is to address at least the above-mentioned problems and/or disadvantages and to provide at least the advantages described below. Accordingly, an aspect of the present invention provides an apparatus and method for transmitting/receiving control data and user data between multiple communication stations by forming multiple communication paths using multiple backhaul links and/or multiple wireless direct links in a communication system.

Another aspect of the present invention provides an apparatus and method for forming multiple backhaul links and/or multiple wireless direct links for data exchange with multiple communication stations by a Multi-Link Relay Station (MLRS) in a multi-path relay system.

A further another aspect of the present invention provides an apparatus and method for forming multiple backhaul links with at least one of wired links, wireless links and wired/wireless combined links, for data exchange with multiple communication stations by an MLRS in a multi-path relay system.

Yet another aspect of the present invention provides an apparatus and method in which an MLRS includes at least one backhaul interface (I/F) unit and/or at least one Mobile Station (MS) I/F unit to form multiple communication paths in a multi-path relay system.

Still another aspect of the present invention provides an apparatus and method for managing resources independently of multiple communication stations connected through multiple backhaul links by an MLRS in a multi-path relay system.

Still another aspect of the present invention provides an apparatus and method for sharing resources for multiple backhaul links and/or multiple wireless direct links by an MLRS in a multi-path relay system.

Still another aspect of the present invention provides an apparatus and method in which an MLRS includes a control unit and a multi-link relay unit, the control unit controls an operation of the MLRS by performing a control process of a preset level, including a multi-path control, and the multi-link relay unit performs an operation of relaying signals between communication stations in a multi-path relay system.

Still another aspect of the present invention provides an apparatus and method in which a control unit in an MLRS further includes a resource management as well as a multi-path control in a multi-path relay system.

Still another aspect of the present invention provides an apparatus and method for controlling path connection for data transmission/reception between multiple communication stations using multiple backhaul links and/or multiple wireless direct links by an MLRS in a multi-path relay system.

Still another aspect of the present invention provides an apparatus and method for supporting multi-homing for at least one MS over multiple paths by means of simultaneous use of at least two backhaul links and/or simultaneous use of at least two MS I/F units by an MLRS in a multi-path relay system.

Still another aspect of the present invention provides an apparatus and method for supporting cooperative transmission/reception through multiple paths using at least two backhaul links and/or at least two MS I/F units by an MLRS in a multi-path relay system.

Still another aspect of the present invention provides an apparatus and method for supporting a handover for an MS using multiple backhaul links by an MLRS in a multi-path relay system.

Technical Solution

In accordance with one aspect of the present invention, there is provided a Multi-Link Relay Station (MLRS) in a communication system, adapted to perform a multi-path control to provide a communication service through multiple communication paths including at least one of at least two backhaul links and at least two wireless direct links.

In accordance with another aspect of the present invention, there is provided a method of performing a multi-path control in a communication system by providing a communication service through multiple communication paths including at least one of at least two backhaul links and at least two wireless direct links.

DESCRIPTION OF DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

MODE FOR INVENTION

Figure 1:
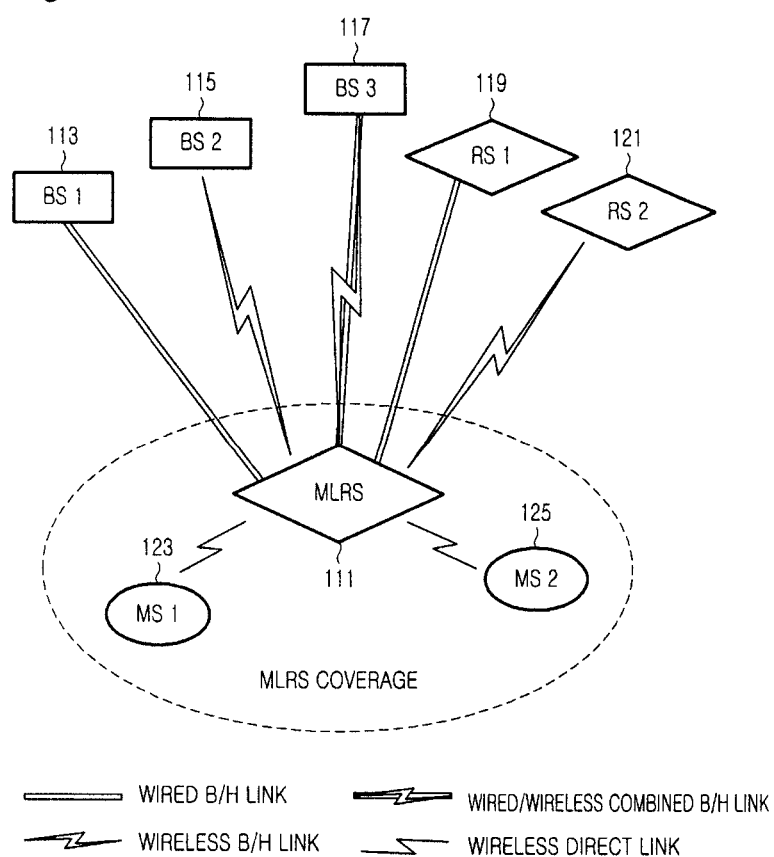
FIG. 1 schematically shows a configuration of a multi-path relay system according to an embodiment of the present invention.

Exemplary embodiments of the present invention will be described herein below in detail with reference to the accompanying drawings. The embodiments described herein and structures shown in the drawings are merely illustrative and do not cover every technical spirit of the invention. Therefore, it will be understood that various modifications which can substitute for the embodiments can be made at the time of filing the present application.

The present invention provides an apparatus and method for relaying multiple links in a communication system. In the following description of the present invention, frequency resources are considered as an example of resources applied in an apparatus and method for relaying multiple links. However, the resources may include time resources, code resources and spatial resources, as well as the frequency resources.

In the following description, resources allocated to backhaul links generated between a Multi-Link Relay Station (MLRS) and other communication terminals (e.g., Base Stations (BSs) or Relay Stations (RSs)) will be represented in the form of "A/B",? which means that among two communication stations generating certain backhaul links, i.e., an MLRS and other communication station, the other communication station uses a resource A in transmitting a signal to the MLRS, while the MLRS uses a resource B in transmitting a signal to the other communication station. The BSs may include femto cells or Access Points (APs).

Herein, it will be assumed that regarding at least two backhaul links sharing one resource, all communication stations communicating with the MLRS share both downlink and uplink resources. However, a set of communication stations sharing the uplink resource may be different from a set of communication stations sharing the downlink resource.

The MLRS may be connected to at least two communication stations by backhaul links to provide communication services to MSs located in coverage of the MLRS.

It should be noted herein that "A/B" as used herein refers to both "A and B" and "A or B". FIG. 1 schematically shows a configuration of a multi-path relay system according to an embodiment of the present invention.

Referring to FIG. 1, the multi-path relay system includes an MLRS 111, multiple BSs, i.e., a BS1 113, a BS2 115 and a BS3 117, multiple RSs, i.e., an RS1 119 and an RS2 121, and multiple Mobile Stations (MSs), i.e., an MS1 123 and an MS2 125.

The MLRS 111 may simultaneously communicate with at least two communication stations except for the MLRS 111 using at least two backhaul links. In other words, the MLRS 111 may be connected to all BSs and RSs with which it will communicate, using individual backhaul links.

In case of FIG. 1, the MLRS 111 simultaneously communicates with the BS1 113, the BS2 115, the BS3 117, the RS1 119 and the RS2 121 using five backhaul links. A description of the backhaul links is given below.

The backhaul links refer to communication links that are not used for direct connection to MSs, and are generated to transmit at least one user signal between two communication stations except for a simple MS (i.e., an MS with a mere MS function). The backhaul links include communication links between the MLRS and the BSs, and all communication links formed between the MLRS and the RSs. The backhaul links may be classified into wired backhaul links, wireless backhaul links and wired/wireless combined backhaul links according to the types of communication links generated between communication stations. Regarding the wireless backhaul links and the wired/wireless combined backhaul links, the wireless links may include the links formed using non-electromagnetic media such as infrared and ultraviolet.

In an example of FIG. 1, the MLRS 111 communicates with the BS1 113 using a wired backhaul link, with the BS2 115 using a wireless backhaul link, with the BS3 117 using a wired/wireless combined backhaul link, with the RS1 119 using a wired backhaul link, and with the RS2 121 using a wireless backhaul link.

Further, the MLRS 111 communicates with the MS1 123 and the MS2 125 using wireless direct links. The direct links as used herein refer to links used for direct connection to MSs. The MLRS 111 may be connected to one communication station using a backhaul link, and even when connected to at least two communication stations, the MLRS 111 may communicate with not all, but only some, of the two communication stations.

The MLRS may be connected to at least two of at least one BS and/or at least one RS using at least two backhaul links among backhaul links to the at least one BS and backhaul links to the at least one RS in the manner described in FIG. 1, and may simultaneously communicate with them.

Next, a description will be made of a method for generating backhaul links using the same resource by an MLRS in a multi-path relay system according to an embodiment of the present invention.

Figure 2:
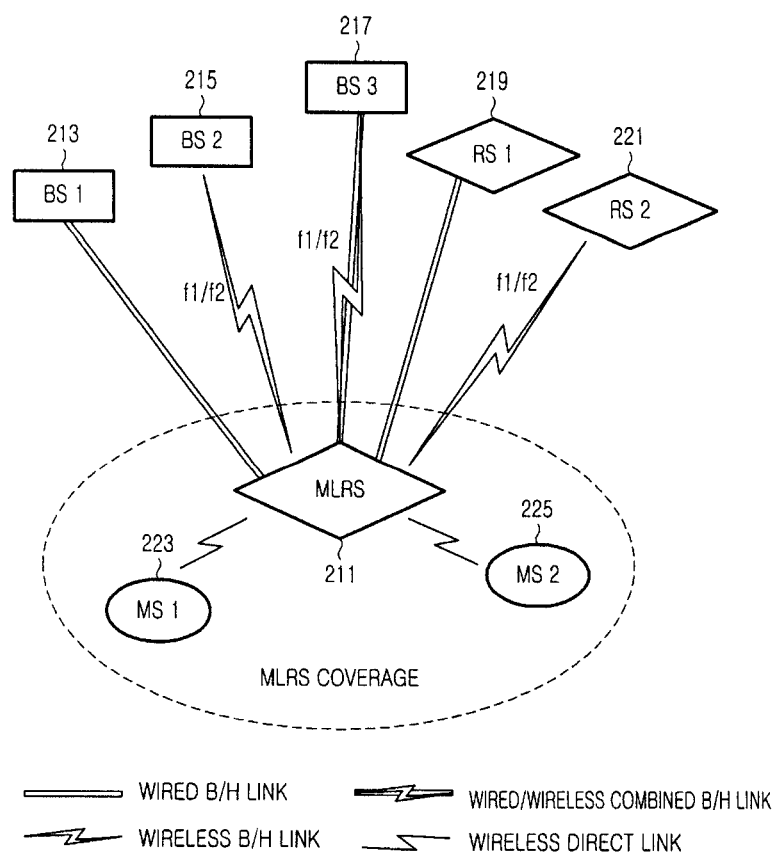
FIG. 2 schematically shows a method for generating backhaul links by sharing the same resource by an MLRS in a multi-path relay system according to an embodiment of the present invention.

FIG. 2 schematically shows a method for generating backhaul links by sharing the same resource by an MLRS in a multi-path relay system according to an embodiment of the present invention.

Referring to FIG. 2, an MLRS 211 uses a first wireless resource f1/f2, which is the same resource, to generate two wireless backhaul links and one wired/wireless combined backhaul link. That is, the MLRS 211 communicates with a BS2 215 using a wireless backhaul link, with a BS3 217 using a wired/wireless combined backhaul link, and with an RS2 221 using a wireless backhaul link. In this case, the MLRS 211, the BS2 215, the BS3 217 and the RS2 221 independently transmit and receive signals by sharing the first wireless resource f1/f2 which is the same wireless resource.

In this manner, the MLRS shares at least one resource with other communication stations to generate at least two backhaul links. Therefore, it is possible to transmit and receive independent signals using at least two backhaul links.

Next, a description will be made of a method for generating backhaul links using different resources for respective backhaul links by an MLRS in a multi-path relay system according to an embodiment of the present invention.

Figure 3:
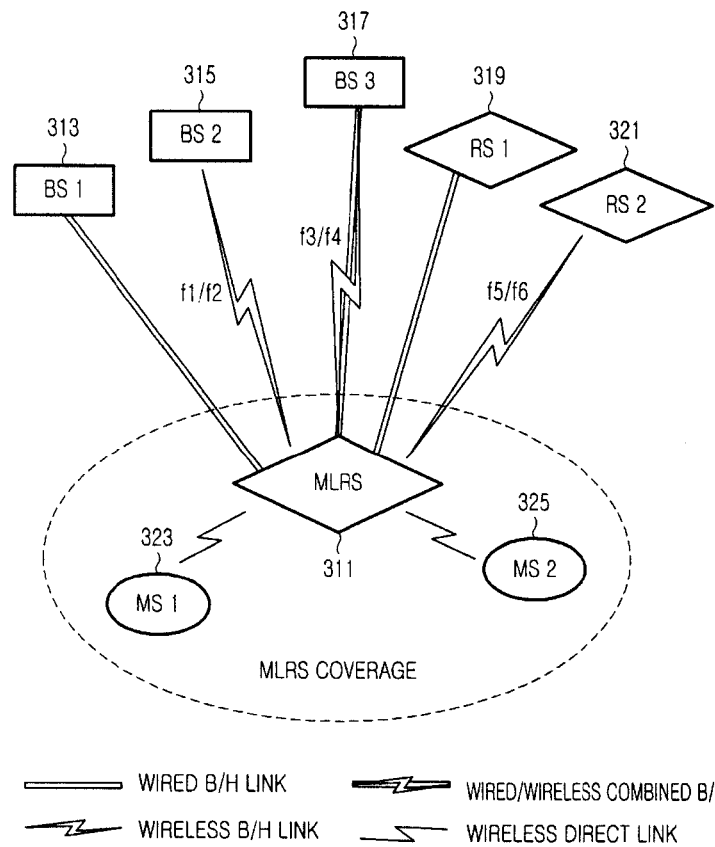
FIG. 3 schematically shows a method for generating backhaul links using different resources for respective backhaul links by an MLRS in a multi-path relay system according to an embodiment of the present invention.

FIG. 3 schematically shows a method for generating backhaul links using different resources for respective backhaul links by an MLRS in a multi-path relay system according to an embodiment of the present invention.

Referring to FIG. 3, an MLRS 311 uses a first wireless resource f1/f2, a second wireless resource f3/f4, and a third wireless resource f5/f6, which are different resources, to generate two wireless backhaul links and one wired/wireless combined backhaul link. That is, the MLRS 311 uses the first wireless resource f1/f2 to generate a wireless backhaul link to a BS2 315, uses the second wireless resource f3/f4 to generate a wired/wireless combined backhaul link to a BS3 317, and uses the third wireless resource f5/f6 to generate a wireless backhaul link to an RS2 321.

In this manner, the MLRS uses different resources for respective backhaul links to generate at least two backhaul links. Hence, it is possible to transmit and receive independent signals using at least two backhaul links.

Next, a description will be made of a method for generating a direct link and some backhaul links using the same resource by an MLRS in a multi-path relay system according to an embodiment of the present invention.

Figure 4:
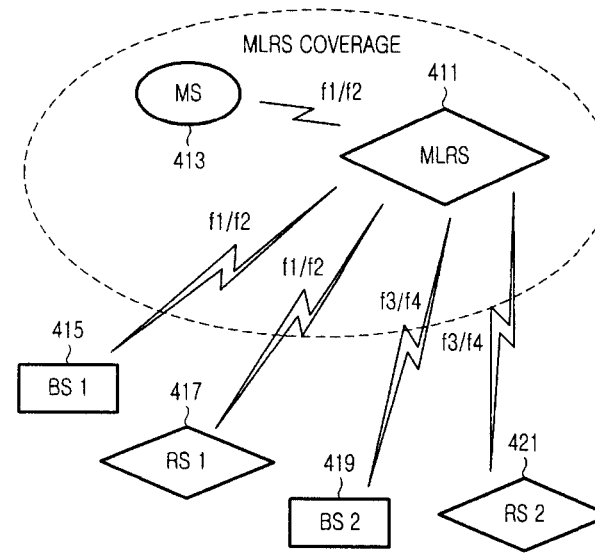
FIG. 4 schematically shows a method for generating a wireless direct link to an MS and some backhaul links by sharing the same resources by an MLRS in a multi-path relay system according to an embodiment of the present invention.

FIG. 4 schematically shows a method for generating a wireless direct link to an MS and some backhaul links by sharing the same resources by an MLRS in a multi-path relay system according to an embodiment of the present invention.

Referring to FIG. 4, an MLRS 411 shares a first wireless resource f2/f2 to generate a direct link to an MS 413, a wireless backhaul link to a BS1 415, and a wireless backhaul link to an RS1 417. In addition, the MLRS 411 shares a second wireless resource f3/f4 to generate a wireless backhaul link to a BS2 419 and a wireless backhaul link to an RS2 421.

In this manner, the MLRS shares one wireless resource to generate a direct link between the MLRS and an MS, and a wireless backhaul link between the MLRS and at least one BS and/or RS. Moreover, the MLRS may use at least one other wireless resource to generate backhaul links to at least one other BS and/or RS.

Next, a description will be made of a method for generating backhaul links using different resources from a resource used for generation of a wireless direct link to an MS and generating some backhaul links by sharing the same resources by an MLRS in a multi-path relay system according to an embodiment of the present invention.

Figure 5:
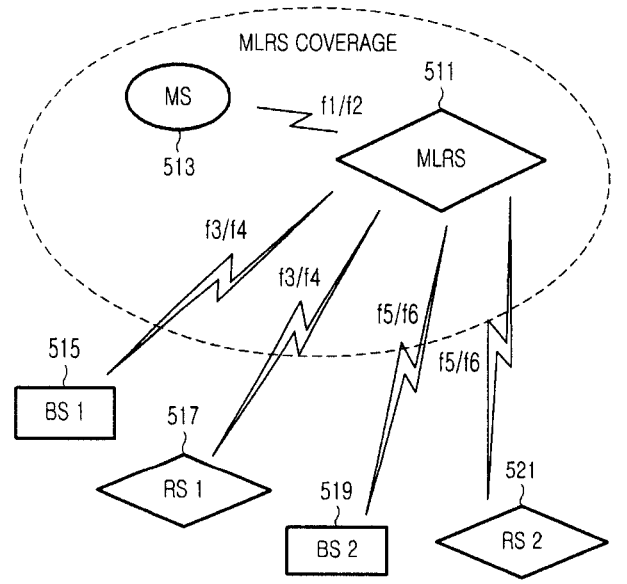
FIG. 5 schematically shows a method for generating backhaul links using different resources from a resource used for generation of a wireless direct link to an MS and generating some backhaul links by sharing the same resources by an MLRS in a multi-path relay system according to an embodiment of the present invention.

FIG. 5 schematically shows a method for generating backhaul links using different resources from a resource used for generation of a wireless direct link to an MS and generating some backhaul links by sharing the same resources by an MLRS in a multi-path relay system according to an embodiment of the present invention.

Referring to FIG. 5, an MLRS 511 shares a first wireless resource f1/f2 to generate a direct link to an MS 513, and uses a second wireless resource f3/f4 to generate a backhaul link to a BS1 515 and a backhaul link to an RS1 517.

In addition, the MLRS 511 shares a third wireless resource f5/f6 generate a backhaul link to a BS2 519 and a backhaul link to an RS2 521.

In this manner, the MLRS may use one wireless resource to generate a direct link to one MS, and may also share at least one other wireless resource to generate backhaul links to at least one BS and/or RS.

Next, a description will be made of a method for generating a set of communication stations sharing uplink backhaul links and a set of communication stations sharing downlink backhaul links by an MLRS in a multi-path relay system according to an embodiment of the present invention. Since communication stations may inverse uplink/downlink resources, a set of communication stations sharing uplink resources and a set of communication stations sharing downlink resources may be set differently.

Figure 6:
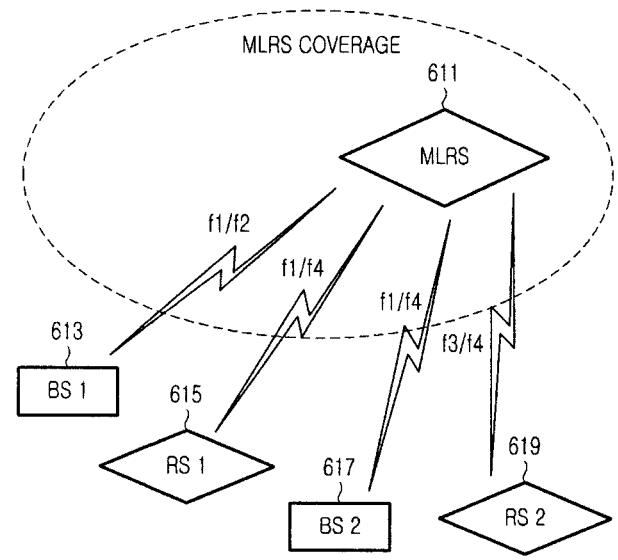
FIG. 6 schematically shows a method for generating backhaul links by an MLRS such that a set of uplink communication stations sharing resources is different from a set of downlink communication stations sharing resources in a multi-path relay system according to an embodiment of the present invention.

FIG. 6 schematically shows a method for generating backhaul links by an MLRS such that a set of uplink communication stations sharing resources is different from a set of downlink communication stations sharing resources in a multi-path relay system according to an embodiment of the present invention.

Referring to FIG. 6, an MLRS 611 shares a first wireless resource f1 to generate an uplink backhaul link to a BS1 613, an uplink backhaul link to an RS1 615 and an uplink backhaul link to a BS2 617. In addition, the MLRS 611 shares a second wireless resource f4 to generate a downlink backhaul link to the RS1 615, a downlink backhaul link to the BS2 617 and a downlink backhaul link to an RS2 619.

In this manner, the MLRS may use resources such that a set of uplink communication stations sharing resources is different from a set of downlink communication stations sharing resources.

Next, a description will be made of a method for generating a backhaul link using a frequency band different from a communication link between a BS and an MS by an MLRS in a multi-path relay system according to an embodiment of the present invention.

Figure 7:
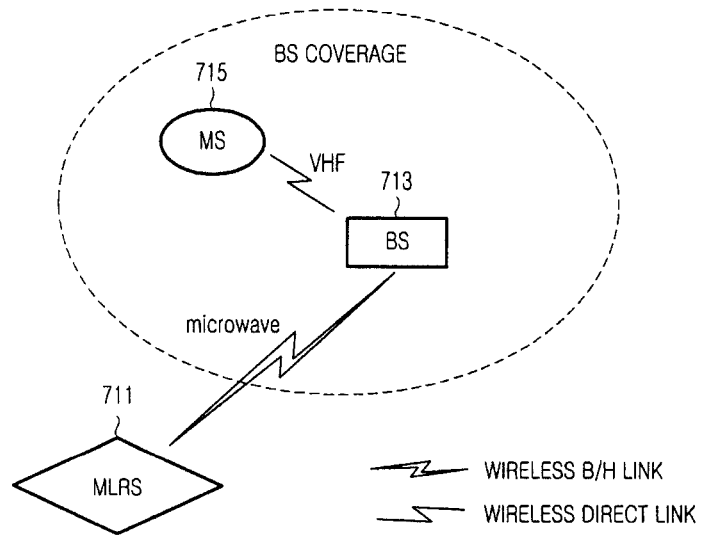
FIG. 7 schematically shows a method for generating backhaul links using a frequency band different from a wireless direct communication link between a BS and an MS by an MLRS in a multi-path relay system according to an embodiment of the present invention.

FIG. 7 schematically shows a method for generating backhaul links using a frequency band different from a wireless direct communication link between a BS and an MS by an MLRS in a multi-path relay system according to an embodiment of the present invention.

Referring to FIG. 7, an MLRS 711 uses a frequency band different from a resource used to generate a link between an MS 715 directly connected to a communication station and the communication station, to generate a backhaul link to the communication station. For example, if the communication station is a BS 713, the MLRS 711 uses a frequency band different from a resource used to generate a link between the BS 713 and the MS 715 to generate the backhaul link. That is, if the resource used to generate the link between the BS 713 and the MS 715 is a Very High Frequency (VHF) frequency band, the MLRS 711 may use a microwave frequency band to generate the backhaul link to the BS 713.

In this manner, when generating a wireless backhaul link to at least one communication station serving an MS, the MLRS may use a frequency band equal to and/or different from a frequency band used between the at least one communication station and the MS.

Meanwhile, superposition coding, Code Division Multiplexing (CDM), Spatial Division Multiplexing (SDM), multi-user Multiple Input Multiple Output (MIMO) transmission, Adaptive Beamforming, Switched Beam, etc. may be used in order for the backhaul links to share resources. The multi-user MIMO transmission may include Dirty Paper Coding (DPC), Precoding, multi-user MIMO, Singular Value Decomposition (SVD), etc.

For the MLRS, relay coverage resources may be allocated as follows.

First, the MLRS may be previously allocated relay coverage resources.

Second, the MLRS is allocated relay coverage resources from communication stations connected using multiple links if necessary, and then may release the allocated resources when the resources are no longer needed.

Third, the MLRS may use the resources independently of the communication stations connected using multiple links.

In accordance with an embodiment of the present invention, the MLRS may be allocated resources from each of at least two communication stations, and manage the allocated resources in an integrated manner, thereby controlling the inter-cell interference.

Next, a description will be made of a structure of an MLRS in a multi-path relay system according to an embodiment of the present invention.

Figure 8:
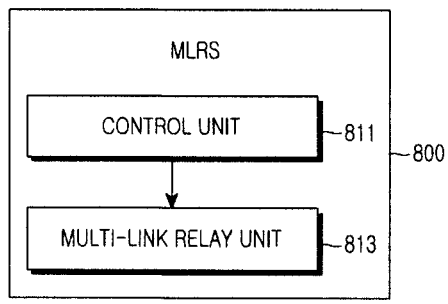
FIG. 8 shows an inner structure of an MLRS in a multi-path relay system according to an embodiment of the present invention.

FIG. 8 shows an inner structure of an MLRS in a multi-path relay system according to an embodiment of the present invention.

Referring to FIG. 8, an MLRS 800 includes a control unit 811 and a multi-link relay unit 813.

The control unit 811 controls an operation of the MLRS 800 by performing a control process of a preset level, which includes a multi-path control function. The multi-path control function is a function of providing communication services by controlling multiple paths consisting of multiple links formed between communication stations. The MLRS 800 may provide a multi-path control function for controlling at least one path, for communication with at least two communication stations. The term "path control" as used herein refers to a control achieved to perform at least one of control operation including path search, path selection, path connection including resource allocation, path release, and path change including resource addition and resource release.

The control unit 811 will be described in detail with reference to FIGS. 9 and 10. The multi-link relay unit 813 performs an operation of relaying signals between communication stations. The multi-link relay unit 813 will be described in detail with reference to FIGS. 11 and 12.

Next, an example of an inner structure of the control unit 811 in FIG. 8 will be described.

Figure 9:
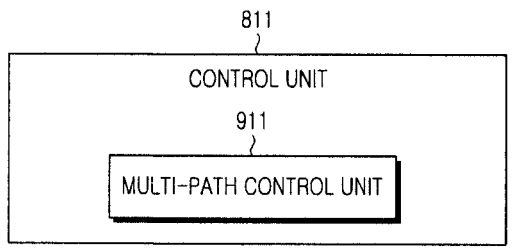
FIG. 9 shows an example of an inner structure of the control unit 811 in FIG. 8.

FIG. 9 shows an example of an inner structure of the control unit 811 in FIG. 8.

Referring to FIG. 9, the control unit 811 includes a multi-path control unit 911. The multi-path control unit 911 performs at least one of a path connection control operation, a multi-homing control operation, a cooperative transmission control operation, and a handover control operation.

The path connection control operation includes a backhaul interface (I/F) sharing control operation, an MS I/F sharing control operation, a backhaul I/F path connection control operation, an MS I/F path connection control operation, and an MS-BS path connection control operation. The multi-homing control operation includes an operation of controlling a multi-homing process that serves one MS using multiple paths. The cooperative transmission control operation controls a process of exchanging at least one data stream with at least one communication station through multiple paths in a cooperative manner. The handover control operation includes a handover decision control operation during inter-coverage handover, a data buffering control operation, and a multi-path based simultaneous transmission control operation.

Next, another example of an inner structure of the control unit 811 in FIG. 8 will be described.

Figure 10:
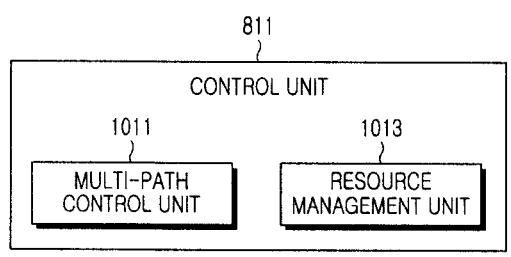
FIG. 10 shows another example of an inner structure of the control unit 811 in FIG. 8.

FIG. 10 shows another example of an inner structure of the control unit 811 in FIG. 8.

Referring to FIG. 10, the control unit 811 includes a multi-path control unit 1011 and a resource management unit 1013. The multi-path control unit 1011 performs the same operation as the multi-path control unit 911 described in FIG. 9.

The resource management unit 1013 performs a resource management operation, a scheduling operation and a Call Admission Control (CAC) operation to manage resources independently of communication stations connected using multiple links.

Next, an example of an inner structure of the multi-link relay unit 813 in FIG. 8 will be described.

Figure 11:
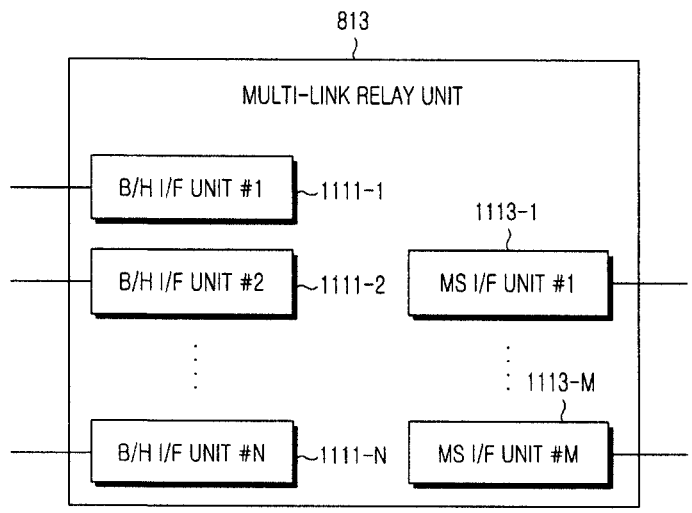
FIG. 11 shows an example of an inner structure of the multi-link relay unit 813 in FIG. 8.

FIG. 11 shows an example of an inner structure of the multi-link relay unit 813 in FIG. 8.

Referring to FIG. 11, the multi-link relay unit 813 includes N backhaul I/F units, i.e., a backhaul I/F unit #1 1111-1 to a backhaul I/F unit #N 1111-N, and M MS I/F units, i.e., an MS I/F unit #1 1113-1 to an MS I/F unit #M 1113-M. In this way, the multi-link relay unit 813 may be constructed to include at least one backhaul I/F unit and at least one MS I/F unit.

Each of the N backhaul I/F units generates a backhaul link to at least one communication station and performs communication using the backhaul link. Each of the M MS I/F units generates a direct link to at least one MS and performs communication using the direct link.

Next, another example of an inner structure of the multi-link relay unit 813 in FIG. 8 will be described.

Figure 12:
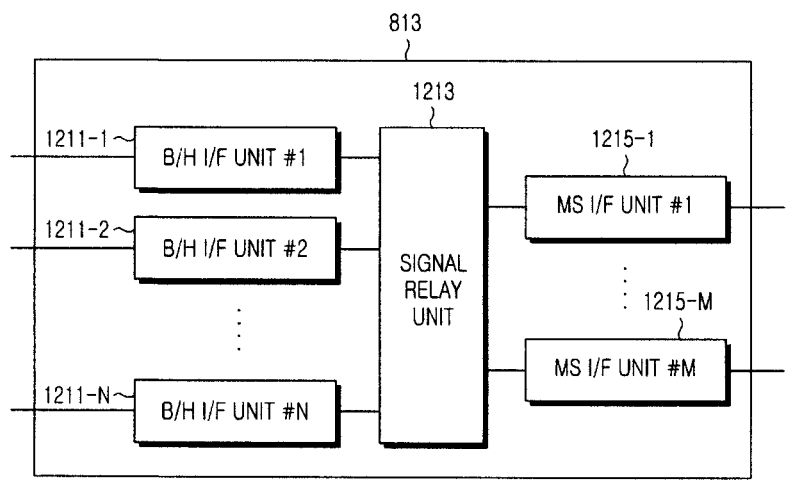
FIG. 12 shows another example of an inner structure of the multi-link relay unit 813 in FIG. 8.

FIG. 12 shows another example of an inner structure of the multi-link relay unit 813 in FIG. 8.

Referring to FIG. 12, the multi-link relay unit 813 includes N backhaul I/F units, i.e., a backhaul I/F unit #1 1211-1 to a backhaul I/F unit #N 1211-N, a signal relay unit 1213, and M MS I/F units, i.e., an MS I/F unit #1 1215-1 to an MS I/F unit #M 1215-M. In this way, the multi-link relay unit 813 includes at least one backhaul I/F unit, at least one MS I/F unit, and the signal relay unit 1213.

Operations of the backhaul I/F unit #1 1211-1 to the backhaul I/F unit #N 1211-N are equal to the operations of the backhaul I/F unit #1 1111-1 to the backhaul I/F unit #N 1111-N described in FIG. 11. Operations of the MS I/F unit #1 1215-1 to the MS I/F unit #M 1215-M are also equal to the operations of the MS I/F unit #1 1113-1 to the MS I/F unit #M 1113-M described in FIG. 11.

The signal relay unit 1213 relays signals between at least one backhaul I/F unit and at least one MS I/F unit. Communication links between the backhaul I/F unit #1 1211-1 to the backhaul I/F unit #N 1211-N and the signal relay unit 1213 are generated in a wired or wireless manner.

If the communication links between the backhaul I/F unit #1 1211-1 to the backhaul I/F unit #N 1211-N and the signal relay unit 1213 are generated in a wireless manner, analog signals or digital signals may be transmitted and received through the generated wireless communication links.

Also, if the communication links between the backhaul I/F unit #1 1211-1 to the backhaul I/F unit #N 1211-N and the signal relay unit 1213 are generated in a wired manner, analog signals or digital signals may be transmitted and received through the generated wired communication links.

Communication links between the signal relay unit 1213 and the MS I/F unit #1 1215-1 to the MS I/F unit #M 1215-M are generated in a wired or wireless manner. If the communication links between the signal relay unit 1213 and the MS I/F unit #1 1215-1 to the MS I/F unit #M 1215-M are generated in a wireless manner, analog signals or digital signals may be transmitted and received through the generated wireless communication links.

Also, if the communication links between the signal relay unit 1213 and the MS I/F unit #1 1215-1 to the MS I/F unit #M 1215-M are generated in a wired manner, analog signals or digital signals may be transmitted and received through the generated wired communication links.

Reference will now be made to a method for controlling path connection for data transmission/reception between multiple communication stations using multiple backhaul links in a multi-path relay system according to an embodiment of the present invention.

Now a description will be made of a method for performing communication with at least two communication stations using at least one backhaul I/F unit by an MLRS in a multi-path relay system according to an embodiment of the present invention.

Figure 13:
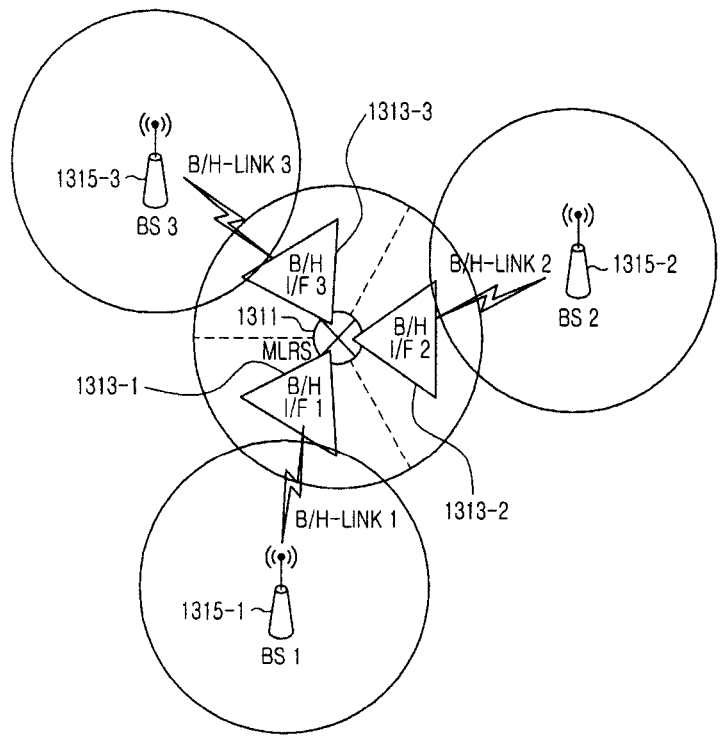
FIG. 13 schematically shows a method for performing communication with at least two communication stations using different backhaul I/F units by an MLRS in a multi-path relay system according to an embodiment of the present invention.

FIG. 13 schematically shows a method for performing communication with at least two communication stations using different backhaul I/F units by an MLRS in a multi-path relay system according to an embodiment of the present invention.

Referring to FIG. 13, an MLRS 1311 includes three backhaul I/F units, i.e., a backhaul I/F unit #1 1313-1 to a backhaul I/F unit #3 1313-3. The backhaul I/F unit #1 1313-1 to the backhaul I/F unit #3 1313-3 communicate with a BS1 1315-1 to a BS3 1315-3, respectively. In FIG. 13, BSs are assumed as an example of communication stations, which may include normal BSs, femto-cell BSs, and RSs.

In this way, an MLRS with at least two backhaul I/F units may communicate with different communication stations using different backhaul I/F units. The two communication stations may be connected to the MLRS through different backhaul I/F units using either the same resource or different resources.

The MLRS may also communicate with at least two communication stations using one backhaul I/F unit. In this case, the at least two communication stations may use Downlink Spatial Multiplexing Cooperative Transmission and Downlink Space Diversity Cooperative Transmission, and the MLRS may use Uplink Spatial Multiplexing Cooperative Transmission and Uplink Space Diversity Cooperative Transmission.

Downlink Spatial Multiplexing Cooperative Transmission may include Spatial Multiplexing, DPC, Precoding, multi-user MIMO, SVD, etc. Downlink Space Diversity Cooperative Transmission may include Transmit Diversity, Alamouti Diversity, Space Time Block Coding (STBC), etc.

Similarly, Uplink Spatial Multiplexing Cooperative Transmission may include Spatial Multiplexing, DPC, Precoding, multi-user MIMO, SVD, etc. Uplink Space Diversity Cooperative Transmission may include Transmit Diversity, Alamouti Diversity, STBC, etc.

When connected by sharing one backhaul I/F unit, at least two communication stations may use either the same resource or different resources, and the one backhaul I/F unit may support MIMO by itself.

Next, a description will be made of a method for performing communication with at least two communication stations using MS I/F units by an MLRS in a multi-path relay system according to an embodiment of the present invention.

For example, the MLRS may connect at least two communication stations through different MS I/F units or by sharing one MS I/F unit. When connected through different MS I/F units, the at least two communication stations may use either the same resource or different resources. Likewise, when connected by sharing one MS I/F unit, the at least two communication stations may use either the same resource or different resources.

Figure 14:
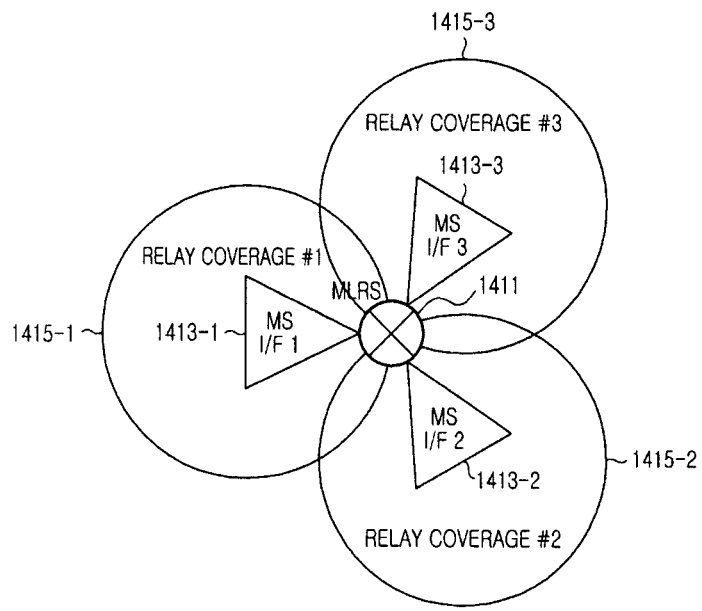
FIG. 14 schematically shows a method for performing communication by an MLRS such that different MS I/F units may serve different relay coverages in a multi-path relay system according to an embodiment of the present invention.

FIG. 14 schematically shows a method for performing communication by an MLRS such that different MS I/F units may serve different relay coverages in a multi-path relay system according to an embodiment of the present invention.

Referring to FIG. 14, an MLRS 1411 includes three MS I/F units, i.e., an MS I/F unit #1 1413-1 to an MS I/F #3 1413-3. The MS I/F unit #1 1413-1 to the MS I/F #3 1413-3 provide services to a relay coverage #1 1415-1 to a relay coverage #3 1415-3, respectively.

In this way, an MLRS with at least two MS I/F units may provide services to different relay coverages using different MS I/F units. When connected through different MS I/F units, the two communication stations may use either the same resource or different resources.

While it has been described in FIG. 14 that the MLRS communicates with at least two communication stations using different MS I/F units, the MLRS may communicate with at least two communication stations using one MS I/F unit. When connected by sharing one MS I/F unit, the at least two communication stations may use either the same resource or different resources, and the one MS I/F unit may support MIMO by itself.

Next, a description will be made of an I/F path connection control function in which an MLRS serves as a relay between two communication stations in a multi-path relay system according to an embodiment of the present invention.

First, regarding a backhaul I/F path connection control method, the MLRS connects with at least one BS or RS using one backhaul I/F unit. As another example, the MLRS connects with at least one BS or RS using at least two backhaul I/F units.

Second, regarding an MS I/F path connection control method, the MLRS connects with at least one MS using one MS I/F unit. As another example, the MLRS connects with at least one MS using at least two MS I/F units.

Figure 15:
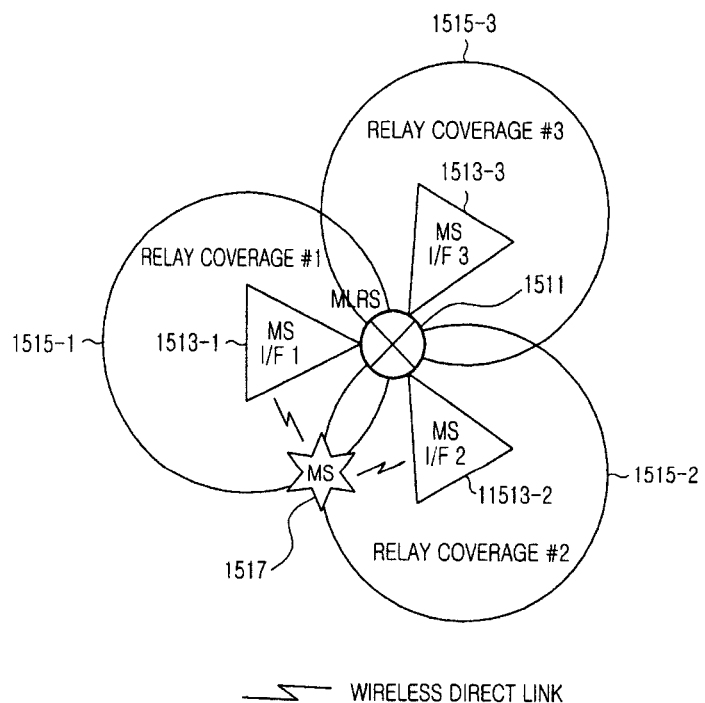
FIG. 15 schematically shows a method for performing communication with at least one communication station using two MS I/F units by an MLRS in a multi-path relay system according to an embodiment of the present invention.

FIG. 15 schematically shows a method for performing communication with at least one communication station using two MS I/F units by an MLRS in a multi-path relay system according to an embodiment of the present invention. That is, an MLRS 1511 includes three MS I/F units, i.e., an MS I/F unit #1 1513-1 to an MS I/F unit #3 1513-3. The MS I/F unit #1 1513-1 to the MS I/F unit #3 1513-3 provide services to a relay coverage #1 1515-1 to a relay coverage #3 1515-3, respectively.

When a communication station 1517 moves between the relay coverage #1 1515-1 served by the MS I/F unit #1 1513-1 and the relay coverage #2 1515-2 served by the MS I/F unit #2 1513-2 in the above-described communication environment, a service for the communication station 1517 is provided using both of the two MS I/F units, i.e., the MS I/F unit #1 1513-1 and the MS I/F unit #2 1513-2. The communication station 1517 may be an MS or the like.

Next, a description will be made of a method for controlling a connection between an MS and a BS in a multi-path relay system according to an embodiment of the present invention.

For the connection control between an MS and a BS, an MS may be connected to at least one BS, or at least two BSs. The control method for a connection between an MS and at least two BS may include multi-homing, cooperative transmission, handover, resource request/release, etc.

It is possible to efficiently transmit and receive data between multiple BSs or multiple RSs using multiple backhaul links by the above-described path connection control in a multi-path relay system according to an embodiment of the present invention.

Now, a description will be made of a multi-homing method of an MLRS in a multi-path relay system according to an embodiment of the present invention.

In the multi-homing method described below, a multi-homing scenario may be considered in which an MLRS serves at least one MS through at least two communication paths. Another multi-homing scenario may also be considered in which an MLRS enables at least one MS to communicate with at least two communication stations at the same time by means of multi-homing communication with the at least two communication stations connected through at least one backhaul I/F unit.

A description will first be made of a multi-homing method in case of receiving the same data streams from multiple communication stations connected using multiple backhaul links by an MLRS in a multi-path relay system according to an embodiment of the present invention.

Figure 16:
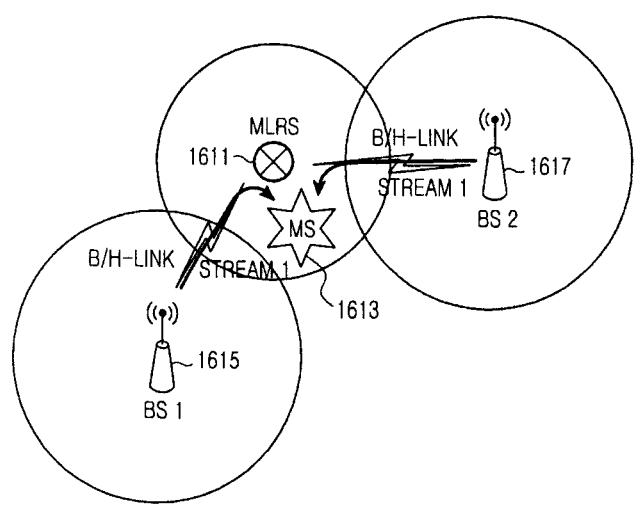
FIG. 16 shows a multi-homing method in case of receiving the same data streams from multiple communication stations connected using multiple backhaul links by an MLRS in a multi-path relay system according to an embodiment of the present invention.

FIG. 16 shows a multi-homing method in case of receiving the same data streams from multiple communication stations connected using multiple backhaul links by an MLRS in a multi-path relay system according to an embodiment of the present invention.

Prior to a description of FIG. 16, it is to be noted that the term "multi-homing" refers to an operation in which an MLRS provides a service to at least one MS through at least two communication paths.

Referring to FIG. 16, an MLRS 1611 receives the same data streams from at least two communication stations through multiple paths. The MLRS 1611 diversity-combines the data streams received through at least two paths using service matching, path selection, or the like.

The MLRS 1611 may receive the same data streams from two BSs connected using multiple backhaul links, i.e., from a BS1 1615 and a BS2 1617, combine the received data streams and transmit the combined data stream to an MS 1613. If the MLRS 1611 supports multicasting, it may transmit the combined data stream to at least two MSs. The received data stream may be combined by diversity combining or multiplexing combining.

The MLRS 1611 may transmit the data streams received from the two BSs 1615 and 1617 connected through multiple backhaul links to at least two MSs.

Next, a description will be made of a multi-homing method in case of receiving different data streams from multiple communication stations connected using multiple backhaul links by an MLRS in a multi-path relay system according to an embodiment of the present invention.

Figure 17:
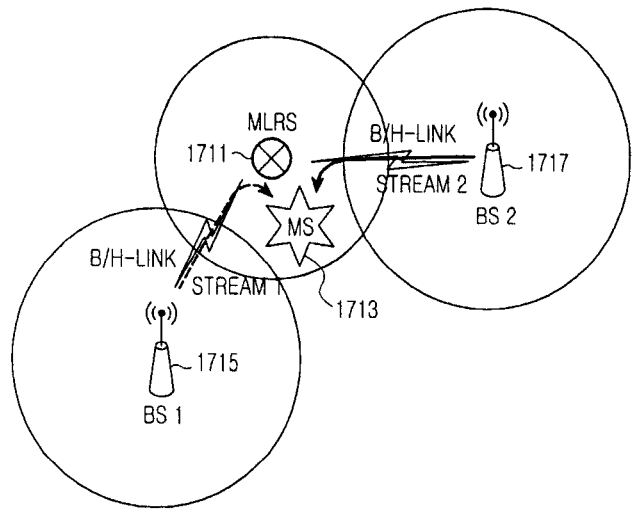
FIG. 17 shows a multi-homing method in case of receiving different data streams from multiple communication stations connected using multiple backhaul links by an MLRS in a multi-path relay system according to an embodiment of the present invention.

FIG. 17 shows a multi-homing method in case of receiving different data streams from multiple communication stations connected using multiple backhaul links by an MLRS in a multi-path relay system according to an embodiment of the present invention.

Referring to FIG. 17, an MLRS 1711 receives different data streams from at least two communication stations through multiple paths. The MLRS 1711 may receive different data streams from two BSs connected using multiple backhaul links, i.e., from a BS1 1715 and a BS2 1717, combine the received data streams and transmit the combined data stream to an MS 1713. The received data streams may be combined by diversity combining or multiplexing combining.

If the MLRS 1711 supports multicasting, it may transmit the combined data stream to at least two MSs. The MLRS 1711 may also transmit the data streams received from the two BSs 1715 and 1717 connected through multiple backhaul links to at least two MSs.

Next, a description will be made of a multi-homing method in case of transmitting the same data stream to multiple communication stations connected using multiple backhaul links by an MLRS in a multi-path relay system according to an embodiment of the present invention.

Figure 18:
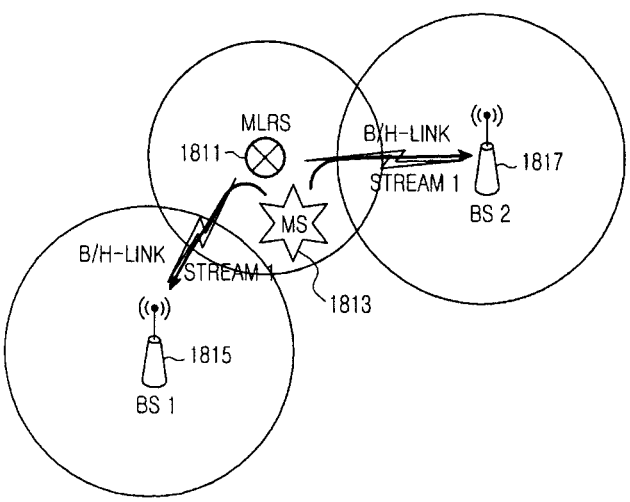
FIG. 18 shows a multi-homing method in case of transmitting the same data stream to multiple communication stations connected using multiple backhaul links by an MLRS in a multi-path relay system according to an embodiment of the present invention.

FIG. 18 shows a multi-homing method in case of transmitting the same data stream to multiple communication stations connected using multiple backhaul links by an MLRS in a multi-path relay system according to an embodiment of the present invention.

Referring to FIG. 18, an MLRS 1811 transmits a data stream received from at least one MS 1813 to BSs connected using multiple backhaul links, i.e., to a BS1 1815 and a BS2 1817 in the same way. In FIG. 18, BSs are assumed as an example of communication stations.

The MLRS 1811 may also transmit the same data streams received from at least two MSs to at least two BSs connected through multiple backhaul links by way of multiple paths.

Next, a description will be made of a multi-homing method in case of transmitting different data streams to multiple communication stations connected using multiple backhaul links by an MLRS in a multi-path relay system according to an embodiment of the present invention.

Figure 19:
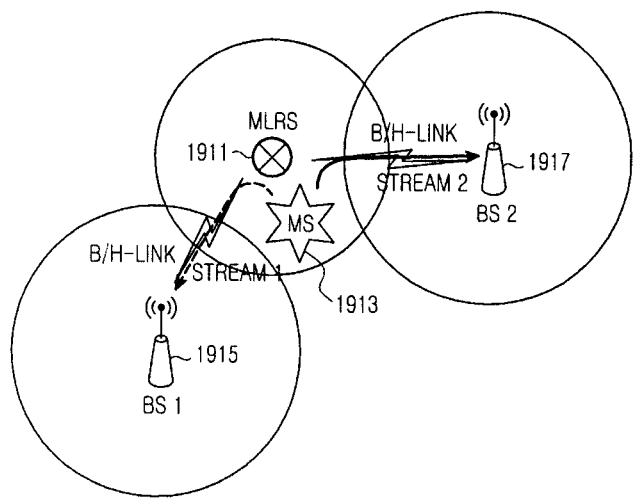
FIG. 19 shows a multi-homing method in case of transmitting different data streams to multiple communication stations connected using multiple backhaul links by an MLRS in a multi-path relay system according to an embodiment of the present invention.

FIG. 19 shows a multi-homing method in case of transmitting different data streams to multiple communication stations connected using multiple backhaul links by an MLRS in a multi-path relay system according to an embodiment of the present invention.

Referring to FIG. 19, an MLRS 1911 divides a data stream received from at least one MS 1913, and transmits the divided data streams to BSs connected using multiple backhaul links, i.e., to a BS1 1915 and a BS2 1917 in different ways. In FIG. 19, BSs are assumed as an example of communication stations.

The MLRS 1911 may also transmit different data streams received from at least two MSs to at least two BSs connected through multiple backhaul links by way of multiple paths.

Meanwhile, communication stations connected to an MLRS using multiple backhaul links may transmit signals to the MLRS in a cooperative manner. The communication stations may also receive signals from the MLRS in a cooperative manner, which is described below with reference to FIGS. 20 and 21.

A description will first be made of a method for transmitting signals to an MLRS by communication stations connected to the MLRS using multiple backhaul links in a cooperative manner in a multi-path relay system according to an embodiment of the present invention.

Figure 20:
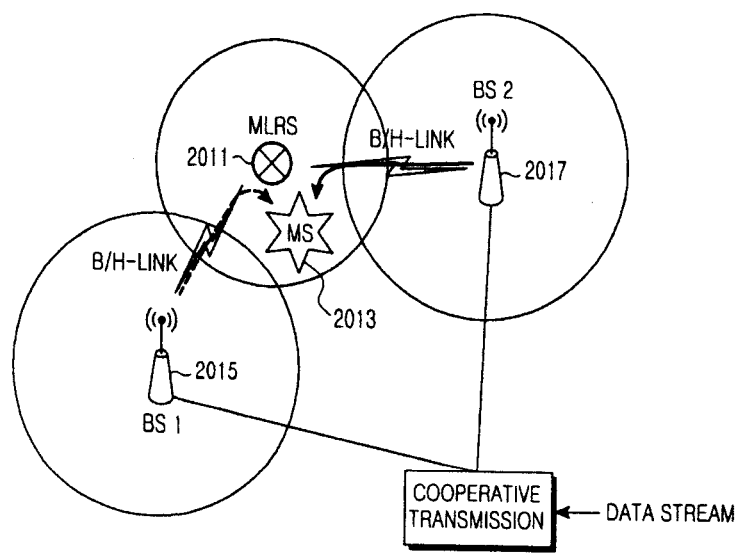
FIG. 20 schematically shows a method for transmitting signals to an MLRS by communication stations connected to the MLRS using multiple backhaul links in a cooperative manner in a multi-path relay system according to an embodiment of the present invention.

FIG. 20 schematically shows a method for transmitting signals to an MLRS by communication stations connected to the MLRS using multiple backhaul links in a cooperative manner in a multi-path relay system according to an embodiment of the present invention.

Referring to FIG. 20, two BSs connected to an MLRS 2011 using multiple backhaul links, i.e., a BS1 2015 and a BS2 2017, transmit signals to the MLRS 2011 in a cooperative manner.

Beamforming, Space Diversity, Spatial Multiplexing, Precoding, multi-user MIMO, DPC, etc. may be used to transmit the signals in a cooperative manner. In FIG. 20, BSs are assumed as an example of communication stations.

Next, a description will be made of a method for receiving signals from an MLRS through multiple backhaul links by communication stations connected to the MLRS using multiple backhaul links in a cooperative manner in a multi-path relay system according to an embodiment of the present invention.

Figure 21:
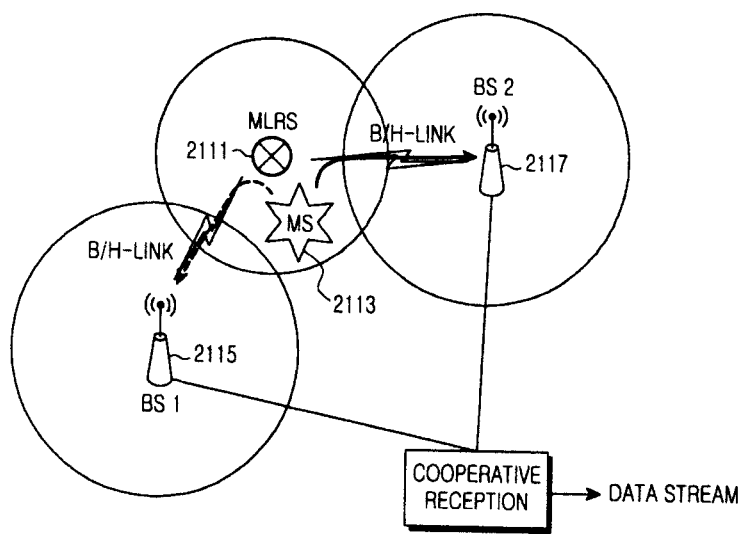
FIG. 21 schematically shows a method for receiving signals from an MLRS through multiple backhaul links by communication stations connected to the MLRS using multiple backhaul links in a cooperative manner in a multi-path relay system according to an embodiment of the present invention.

FIG. 21 schematically shows a method for receiving signals from an MLRS through multiple backhaul links by communication stations connected to the MLRS using multiple backhaul links in a cooperative manner in a multi-path relay system according to an embodiment of the present invention.

Referring to FIG. 21, an MLRS 2111 transmits the same data stream to two BSs connected using multiple backhaul links, i.e., to a BS1 2115 and a BS2 2117. The BS1 2115 and the BS2 2117 process the signals received from the MLRS 2111 in a cooperative manner. Beamforming, Space Diversity, Spatial Multiplexing, Postcoding, multi-user MIMO Detection, DPC Decoding, etc. may be used to receive the signals in a cooperative manner. In FIG. 21, BSs are assumed as an example of communication stations.

Next, a description will be made of a multi-homing method for transmitting data streams to at least one MS connected through at least two MS I/F units by way of at least two communication paths by an MLRS in a multi-path relay system according to an embodiment of the present invention.

Figure 32:
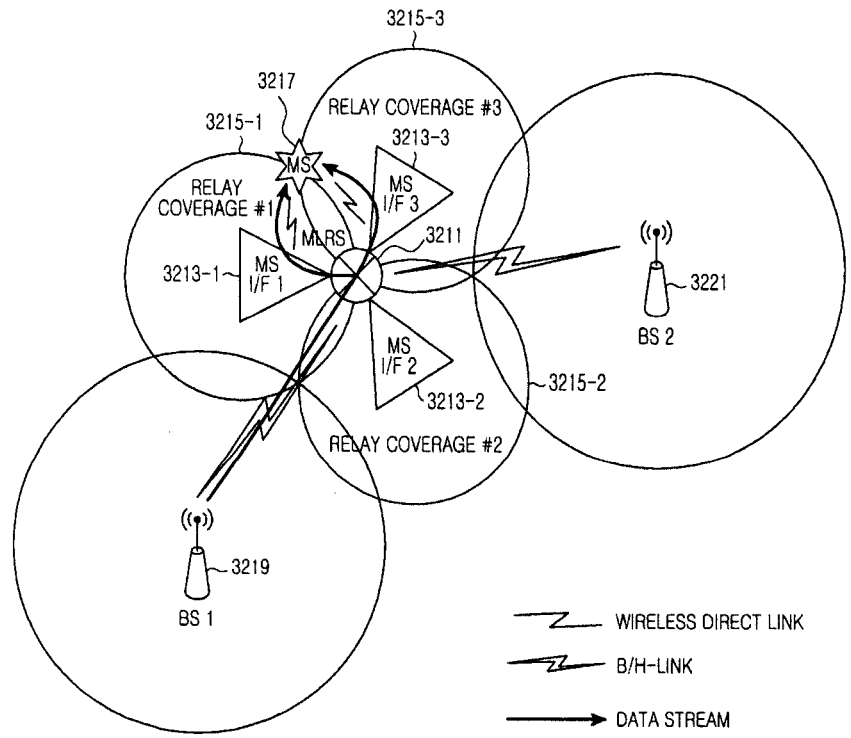
FIG. 32 shows a multi-homing example of transmitting the same data stream to at least one MS connected through multiple MS I/F units according to an embodiment of the present invention.

FIG. 32 shows a multi-homing example of transmitting the same data stream to at least one MS connected through multiple MS I/F units according to an embodiment of the present invention. In this example, at least one communication station communicates with at least one MS via an MLRS. The at least one MS is connected to the MLRS through at least two MS I/F units. The MLRS transmits data streams by multi-homing to the at least one MS through at least two communication paths.

To this end, the MLRS receives a data stream from at least one communication station connected via at least one backhaul I/F unit, and transmits the received data stream to at least one MS connected to at least two MS I/F units in the MLRS. The MLRS forms multiple paths to the at least one MS through at least two MS I/F units. The at least one MS performs diversity combining, including traffic matching and path selection, on data streams received through the multiple paths.

Referring to FIG. 32, an MLRS 3211 receives a data stream for an MS 3217 from a BS1 3219 connected through a backhaul link. The MLRS 3211 may transmit the same data stream to the MS 3217 connected to its two MS I/F units 3213-1 and 3213-3 through two independent wireless direct links.

The MLRS 3211 may also transmit the data stream received from the BS1 3219 connected through a backhaul link to at least two MSs connected to its at least two MS I/F units. All or some of the at least two MS I/F units to which the at least two MSs are connected may be identical to or different from each other.

Figure 33:
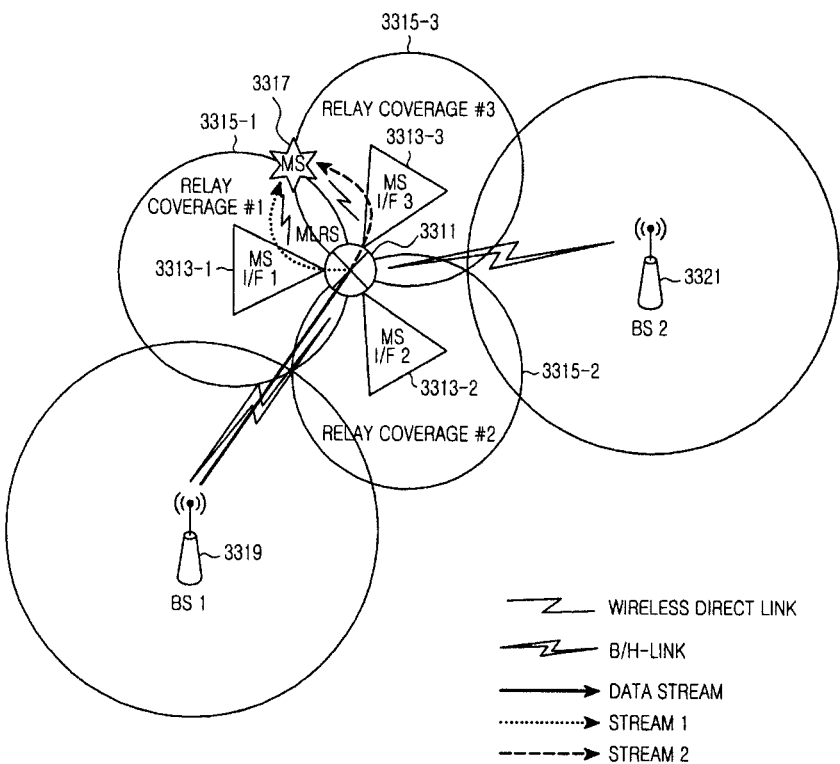
FIG. 33 shows a multi-homing example of transmitting different data streams to at least one MS connected through multiple MS I/F units according to an embodiment of the present invention.

FIG. 33 shows a multi-homing example of transmitting different data streams to at least one MS connected through multiple MS I/F units according to an embodiment of the present invention. In this example, an MLRS transmits different data streams received from at least one communication station to at least one MS through multiple paths formed through at least two MS I/F units. The MLRS and the at least one communication station are connected through at least one backhaul link, and the MLRS and the at least one MS are through at least two MS I/F units. Therefore, the MLRS may transmit different data streams to the at least one MS using multiple links.

Referring to FIG. 33, an MLRS 3311 receives a data stream from a BS1 3319 connected through a backhaul link. The MLRS 3311 may transmit different data streams to an MS 3317 connected to its at least two MS I/F units 3313-1 and 3313-3 through at least two independent wireless direct links.

The MLRS 3311 may also transmit the data stream received from the BS1 3319 connected through a backhaul link to at least two MSs connected to its at least two MS I/F units. All or some of the at least two MS I/F units to which the at least two MSs are connected may be identical to or different from each other.

The MS that has received the data streams through multiple paths processes the received data streams by diversity combining or multiplexing combining.

As in the method described with reference to FIGS. 32 and 33, the MLRS may receive data streams from at least one MS through multiple paths.

Figure 34:
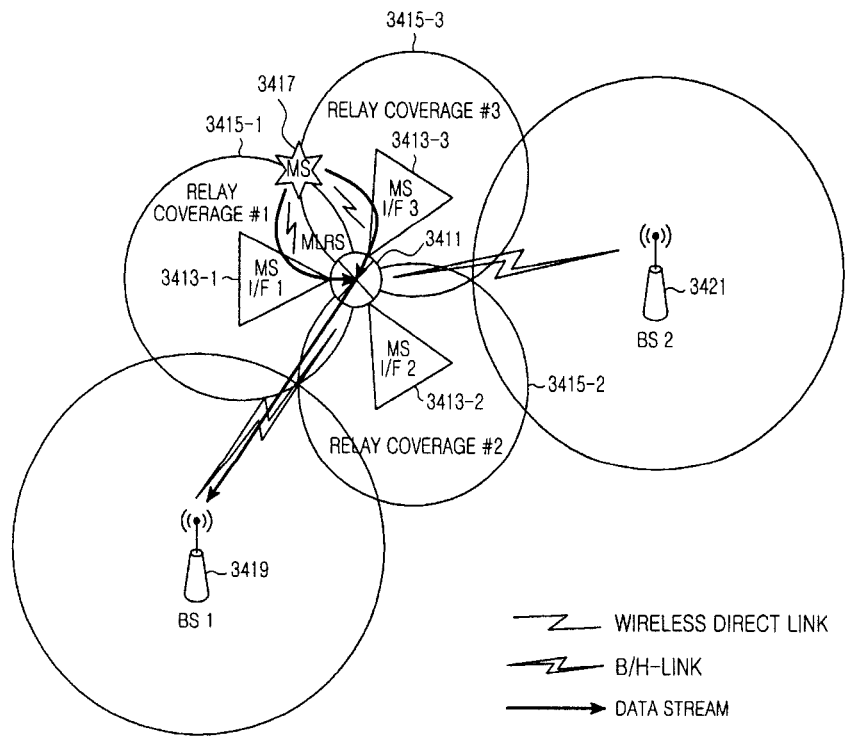
FIG. 34 shows a multi-homing example of receiving the same data stream from at least one MS connected through multiple MS I/F units according to an embodiment of the present invention.

FIG. 34 shows a multi-homing example of receiving the same data stream from at least one MS connected through multiple MS I/F units according to an embodiment of the present invention. In this example, an MLRS receives the same data stream from at least one MS through at least two multiple paths. The at least one MS is connected to the MLRS by at least two MS I/F units.

Referring to FIG. 34, an MLRS 3411 receives the same data streams from at least one MS 3417 connected to at least two MS I/F units 3413-1 and 3413-3 through multiple paths. The MLRS 3411 diversity-combines the received data streams and transmits the combined data stream to a BS1 3419.

The MLRS 3411 may also combine data streams received from each of at least two MSs connected to at least two MS I/F units and transmit the combined data stream to the BS1 3419. All or some of the at least two MS I/F units to which the at least two MSs are connected may be identical to or different from each other.

Figure 35:
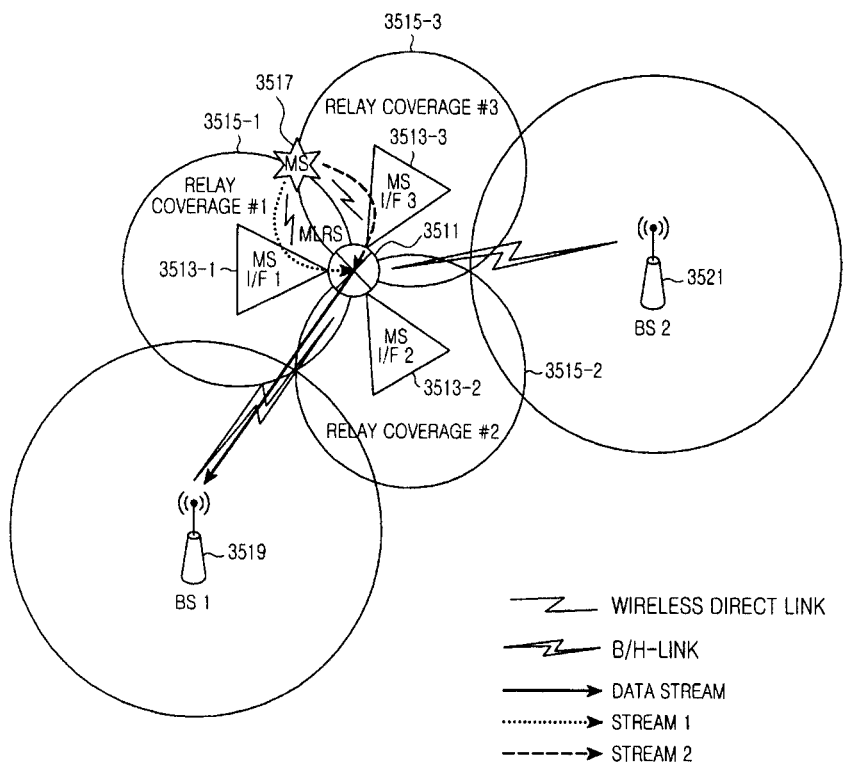
FIG. 35 shows a multi-homing example of receiving different data streams from at least one MS connected through multiple MS I/F units according to an embodiment of the present invention.

FIG. 35 shows a multi-homing example of receiving different data streams from at least one MS connected through multiple MS I/F units according to an embodiment of the present invention. In this example, an MLRS receives different data streams from each of at least one MS through at least two multiple paths. The at least one MS is connected to the MLRS by at least two MS I/F units.

Referring to FIG. 35, an MLRS 3511 receives different data streams from at least one MS 3517 connected to its at least two MS I/F units 3513-1 and 3513-3 through multiple paths. The MLRS 3511 multiplexing-combines the received data streams and transmits the combined data stream to a BS1 3519.

The MLRS 3511 may also combine data streams received from each of at least two MSs connected to the at least two MS I/F units and transmit the combined data stream to the BS1 3519. All or some of the at least two MS I/F units to which the at least two MSs are connected may be identical to or different from each other.

Figure 36:
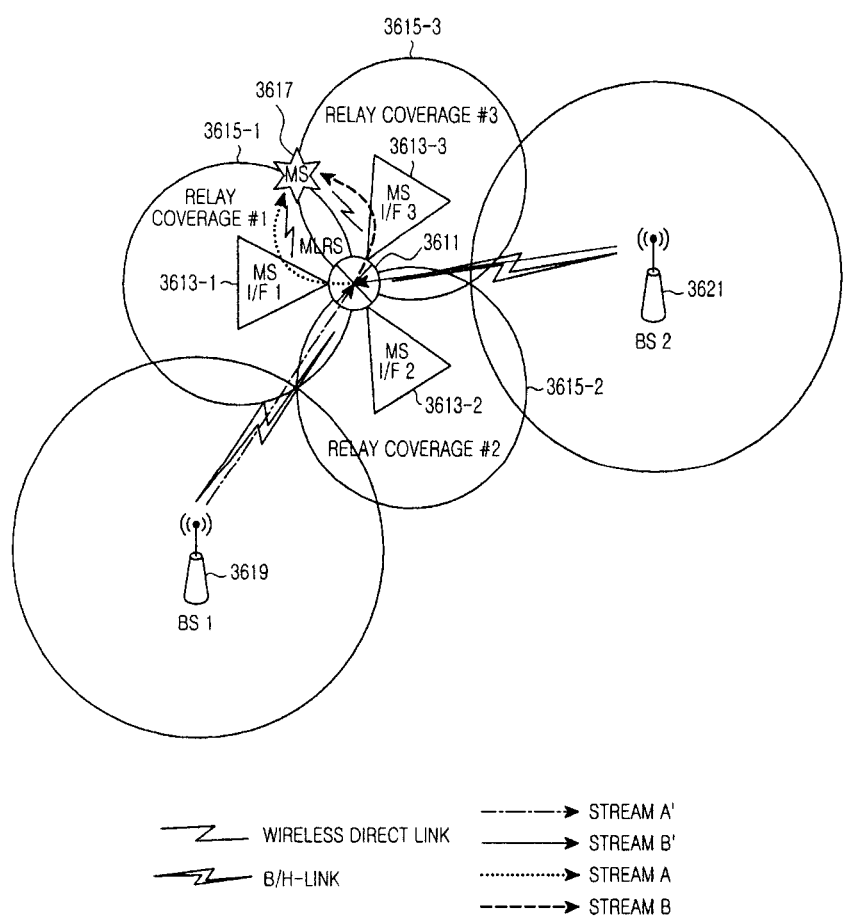
FIG. 36 shows a multi-homing example of relaying, to at least one MS, data streams received from two BSs through multiple paths consisting of at least two backhaul links and at least two wireless direct links according to an embodiment of the present invention.

FIG. 36 shows a multi-homing example of relaying, to at least one MS, data streams received from two BSs through multiple paths consisting of at least two backhaul links and at least two wireless direct links according to an embodiment of the present invention. In this example, an MLRS relays data streams between at least two communication stations and at least one MS. The at least two communication stations are connected to the MLRS through at least one backhaul I/F unit, and the at least one MS is connected to the MLRS through at least two MS I/F units. For the relay, the MLRS receives at least one data stream from at least two communication stations through multiple backhaul links. The MLRS transmits the received at least one data stream by multi-homing to each of at least one MS connected to at least two MS I/F units through multiple independent wireless direct links. The MLRS processes the data streams received from at least two communication stations by diversity combining or multiplexing combining.

Referring to FIG. 36, an MLRS 3611 receives at least two data streams from at least two BSs 3619 and 3621 connected through multiple backhaul links. The MLRS 3611 transmits the received at least two data streams by multi-homing to each of at least one MS 3617 connected to its at least two MS I/F units 3613-1 and 3613-3 through at least two independent wireless direct links.

The MLRS 3611 may receive the same data streams (stream A'=stream B') or different data streams (stream A'≠stream B') from the at least two BSs 3619 and 3621 connected through multiple backhaul links. The MLRS 3611 may also transmit the same data streams (stream A=stream B) or different data streams (stream A≠stream B) to each of at least one MS through multiple wireless direct links. Also, the MLRS 3611 may transmit a data stream received from one BS1 3619 directly to the MS 3617 through at least one wireless direct link (stream A'=stream A), and may transmit a data stream received from another BS2 3621 directly to the MS 3617 through other at least one wireless direct link (stream B'=stream B).

In addition, the MLRS 3611 may independently transmit data streams received from at least two BSs 3619 and 3621 connected through multiple backhaul links to each of at least two MSs connected to its at least two MS I/F units. All or some of the at least two MS I/F units to which the at least two MSs are connected may be identical to or different from each other.

Figure 37:
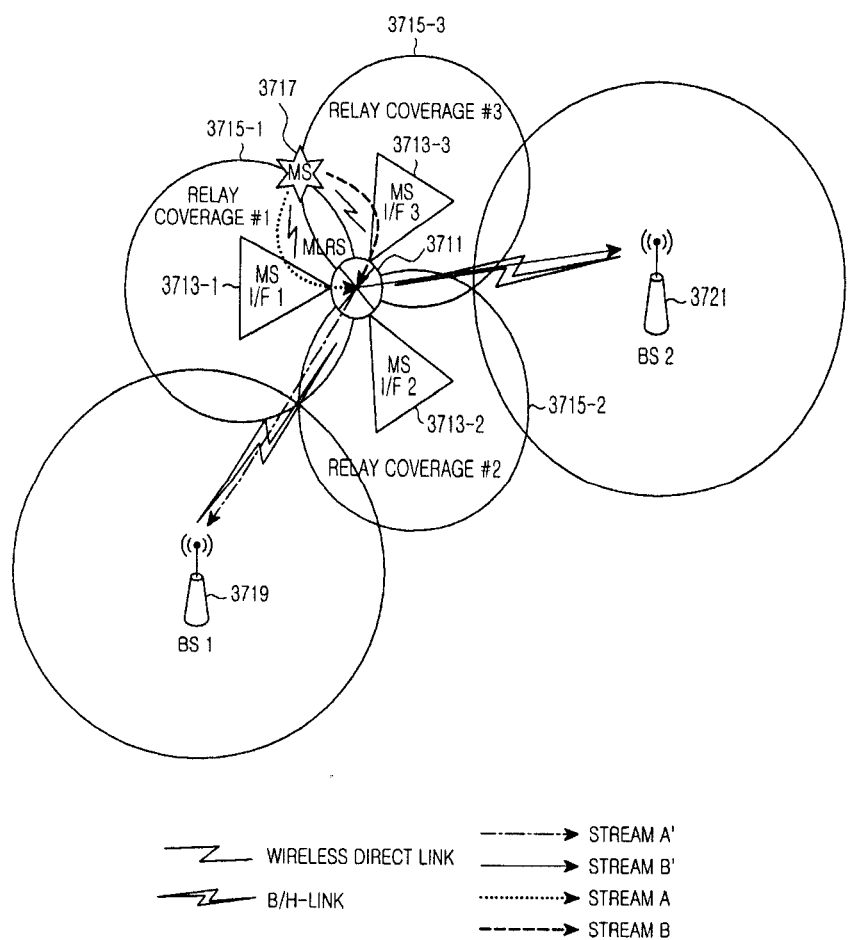
FIG. 37 shows a multi-homing example of relaying data streams received from at least one MS to at least two BSs through multiple paths consisting of at least two backhaul links and at least two wireless direct links according to an embodiment of the present invention.

FIG. 37 shows a multi-homing example of relaying data streams received from at least one MS to at least two BSs through multiple paths consisting of at least two backhaul links and at least two wireless direct links according to an embodiment of the present invention. In this example, an MLRS receives data streams from each of at least one MS connected to at least two MS I/F units through multiple independent wireless direct links. The MLRS transmits the received data streams by multi-homing to at least two communication stations through multiple backhaul links. The MLRS processes the data streams received from the at least two MS I/F units by diversity combining or multiplexing combining.

Referring to FIG. 37, an MLRS 3711 receives data streams from each of at least one MS 3717 connected to its at least two MS I/F units through at least two independent wireless direct links. The MLRS 3711 transmits the received data streams by multi-homing to at least two BSs connected through multiple backhaul links.

The MLRS 3711 may receive the same data streams (stream A=stream B) or different data streams (stream A≠stream B) from each of at least one MS through multiple wireless direct links. The MLRS 3711 may also transmit the same data streams (stream A'=stream B') or different data streams (stream A'≠stream B') to at least two BSs connected through multiple backhaul links. Also, the MLRS 3711 may transmit a data stream received from the MS 3717 through one wireless direct link directly to at least one BS1 3719 (stream A=stream A'), and may transmit a data stream received from the MS 3717 through another wireless direct link directly to other at least one BS2 3721 (stream B=stream B').

In addition, the MLRS may combine data streams received from each of at least two MSs connected to its at least two MS I/F units, and transmit the combined data stream to at least two BSs connected through multiple backhaul links. All or some of the at least two MS I/F units to which the at least two MSs are connected may be identical to or different from each other.

Figure 38:
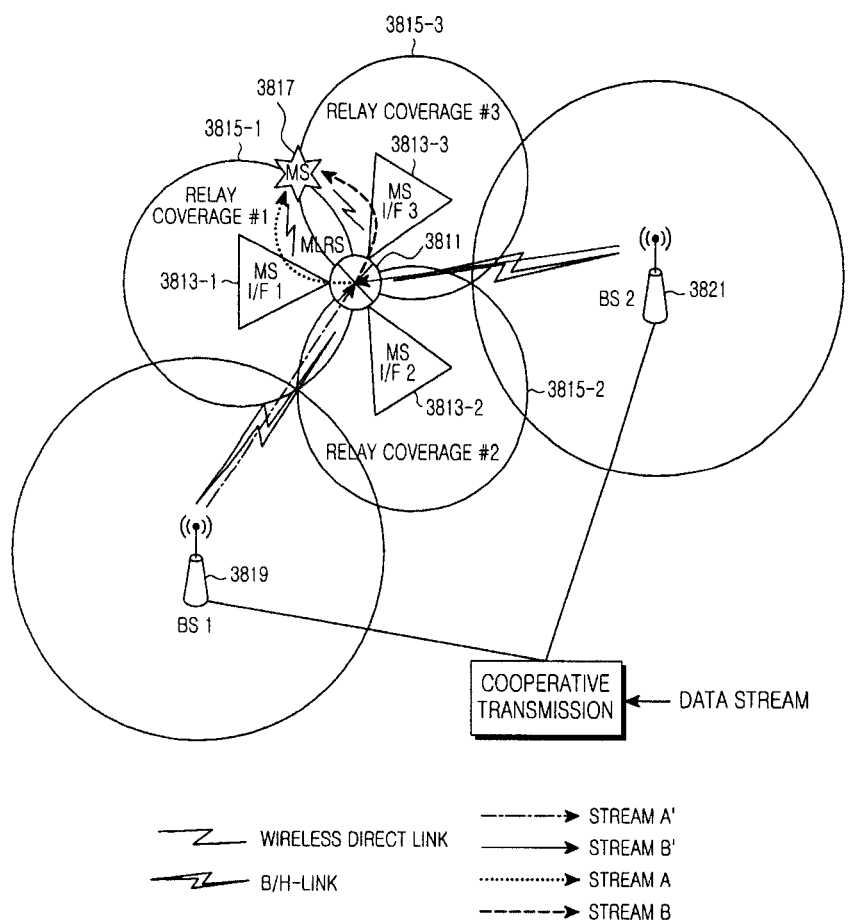
FIG. 38 shows an example of transmitting signals to an MLRS by multiple communication stations connected through multiple backhaul links in a cooperative manner for multi-homing based on at least two backhaul links and at least two wireless direct links according to an embodiment of the present invention.

FIG. 38 shows an example of transmitting signals to an MLRS by multiple communication stations connected through multiple backhaul links in a cooperative manner for multi-homing based on at least two backhaul links and at least two wireless direct links according to an embodiment of the present invention.

In this example, when an MLRS transmits independent data streams by multi-homing between at least two communication stations and each of at least one MS connected through at least two MS I/F units, the communication stations connected to the MLRS through multiple backhaul links transmit signals to the MLRS in a cooperative manner.

Referring to FIG. 38, at least two BSs 3819 and 3821 connected to an MLRS 3811 through multiple backhaul links may transmit signals to the MLRS 3811 in a cooperative manner. The cooperative transmission method may include Beamforming, Space Diversity, Simple Spatial Multiplexing, Precoding, multi-user MIMO, DPC, etc.

Figure 39:
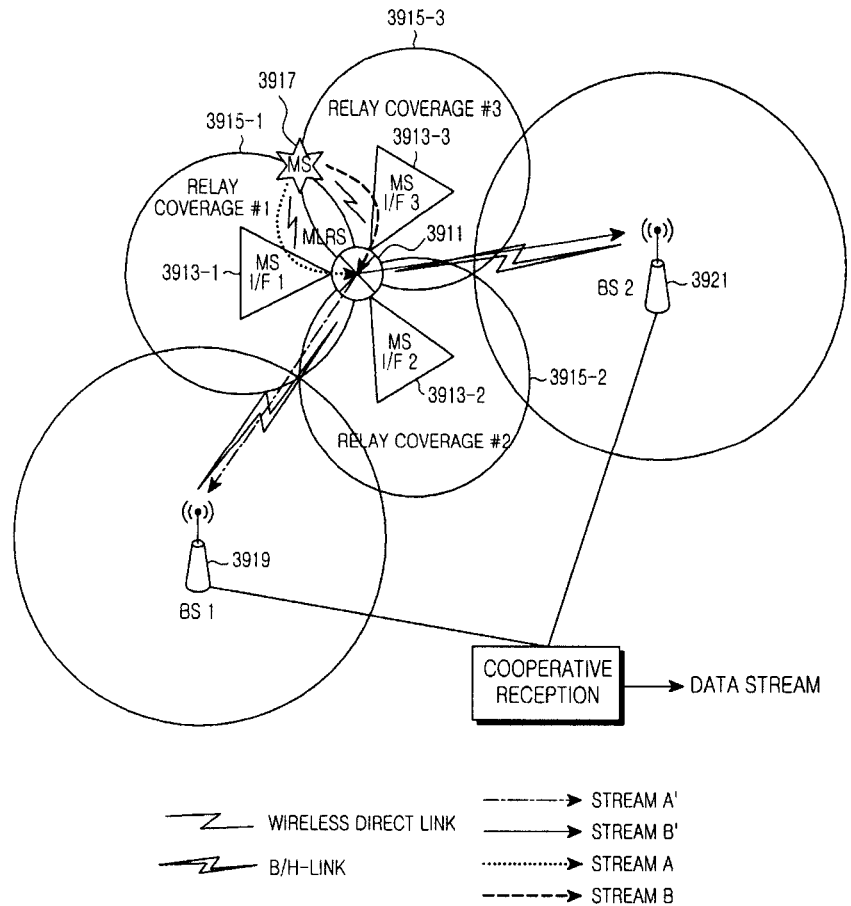
FIG. 39 shows an example of receiving signals from an MLRS by multiple communication stations connected through multiple backhaul links in a cooperative manner for multi-homing based on at least two backhaul links and at least two wireless direct links according to an embodiment of the present invention.

FIG. 39 shows an example of receiving signals from an MLRS by multiple communication stations connected through multiple backhaul links in a cooperative manner for multi-homing based on at least two backhaul links and at least two wireless direct links according to an embodiment of the present invention. In this example, communication stations process signals received from an MLRS through multiple backhaul links in a cooperative manner.

Referring to FIG. 39, at least two BSs 3919 and 3921 connected to an MLRS 3911 through multiple backhaul links may process signals received from the MLRS 3911 in a cooperative manner. The cooperative reception method may include Beamforming, Space Diversity, Simple Spatial Multiplexing, Postcoding, multi-user MIMO Detection, DPC Decoding, etc.

Based on the above-described multi-homing in a multi-path relay system according to an embodiment of the present invention, an MLRS may simultaneously communicate with at least two communication stations using multiple backhaul links, facilitating diverse designs of the communication system. It is also possible to guarantee a certain level of a signal quality for MSs located in a cell boundary in which a BS can hardly control the MSs directly, and to which the BS can hardly transmit data directly.

Next, a description will be made of a cooperative transmission control method in a multi-path relay system according to an embodiment of the present invention.

In an embodiment of the present invention, it is possible to perform cooperative transmission/reception with at least one communication station through at least two communication paths using an MLRS. As an example, there is a procedure in which an MLRS cooperatively transmits or receives signals to/from each of at least one BS connected through its at least two backhaul I/F units. There is another procedure in which the MLRS cooperatively transmits or receives signals to/from each of at least one MS connected through its at least two MS I/F units.

Figure 40:
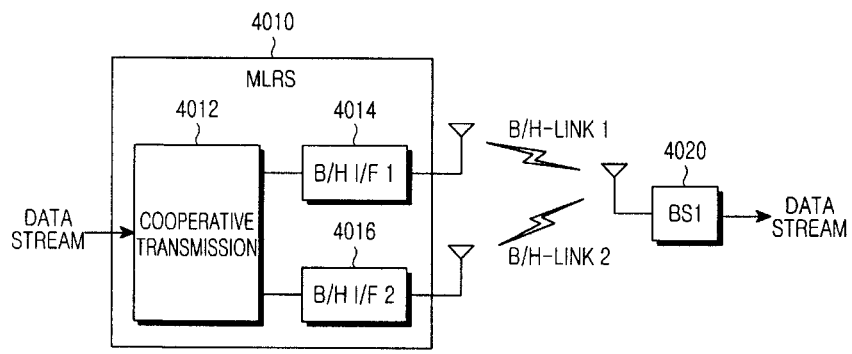
FIG. 40 shows an example of transmitting signals to at least one BS connected through at least two backhaul I/F units by an MLRS in a cooperative manner according to an embodiment of the present invention.

FIG. 40 shows an example of transmitting signals to at least one BS connected through at least two backhaul I/F units by an MLRS in a cooperative manner according to an embodiment of the present invention.

In this example, an MLRS cooperatively transmits signals to at least one communication station connected through its at least two backhaul I/F units by way of multiple paths. The cooperative transmission method may include Beamforming, Space Diversity, Simple Spatial Multiplexing, Precoding, multi-user MIMO, DPC, etc.

Referring to FIG. 40, an MLRS 4010 cooperatively transmits signals to each of at least one BS1 4020 connected to its at least two backhaul I/F units 4014 and 4016 through associated multiple backhaul links. The MLRS 4010 may also cooperatively transmit signals to each of at least two BSs connected to its at least two backhaul I/F units 4014 and 4016 through associated backhaul links. All or some of the at least two backhaul I/F units to which the at least two BSs are connected may be identical to or different from each other.

Figure 41:
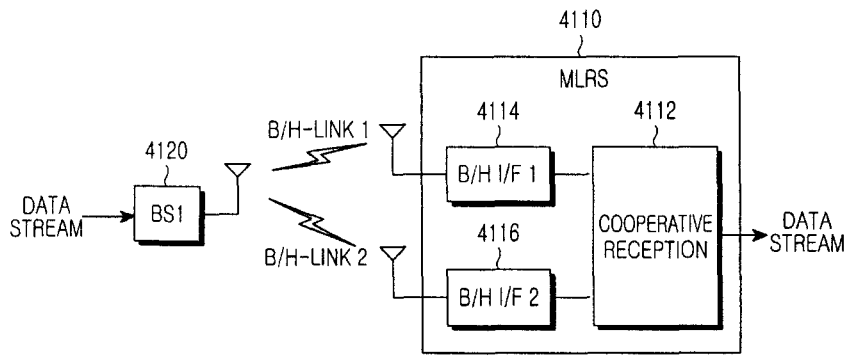
FIG. 41 shows an example of receiving signals from at least one BS connected through at least two backhaul I/F units by an MLRS in a cooperative manner according to an embodiment of the present invention.

FIG. 41 shows an example of receiving signals from at least one BS connected through at least two backhaul I/F units by an MLRS in a cooperative manner according to an embodiment of the present invention.

In this example, an MLRS cooperatively receives signals from at least one communication station connected through its at least two backhaul I/F units by way of multiple paths. The cooperative reception method may include Beamforming, Space Diversity, Simple Spatial Multiplexing, Postcoding, multi-user MIMO Detection, DPC Decoding, etc.

Referring to FIG. 41, an MLRS 4110 cooperatively receives signals from each of at least one BS1 4120 connected to its at least two backhaul I/F units 4112 and 4114 by way of associated backhaul links. The MLRS 4110 may also cooperatively receive signals from at least two BSs connected to its at least two backhaul I/F units 4112 and 4114 by way of associated backhaul links. All or some of the at least two backhaul I/F units to which the at least two BSs are connected may be identical to or different from each other.

Figure 42:
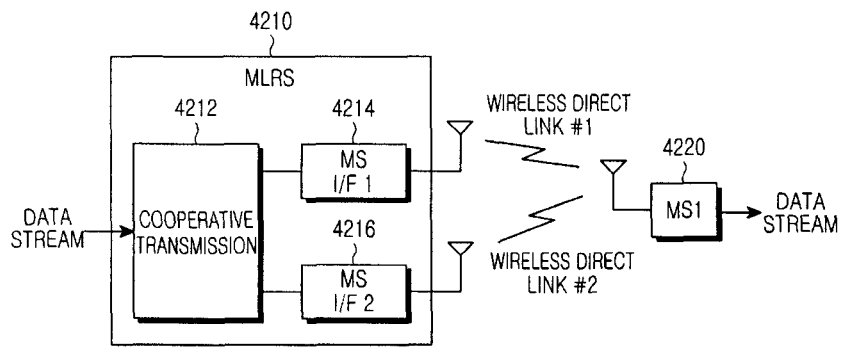
FIG. 42 shows an example of transmitting signals to at least one MS connected through at least two MS I/F units by an MLRS in a cooperative manner according to an embodiment of the present invention.

FIG. 42 shows an example of transmitting signals to each of at least one MS connected through at least two MS I/F units by an MLRS in a cooperative manner according to an embodiment of the present invention.

In this example, an MLRS cooperatively transmits signals to each of at least one communication station connected through its at least two MS I/F units by way of associated multiple paths. The cooperative transmission method may include Beamforming, Space Diversity, Simple Spatial Multiplexing, Precoding, multi-user MIMO, DPC, etc.

Referring to FIG. 42, an MLRS 4210 cooperatively transmits signals to each of at least one MS1 4220 connected to its at least two MS I/F units 4214 and 4216 through associated multiple wireless direct links. The MLRS 4210 may also cooperatively transmit signals to each of at least two MSs connected to its at least two MS I/F units 4214 and 4216 through associated multiple wireless direct links. All or some of the at least two MS I/F units to which the at least two MSs are connected may be identical to or different from each other.

Figure 43:
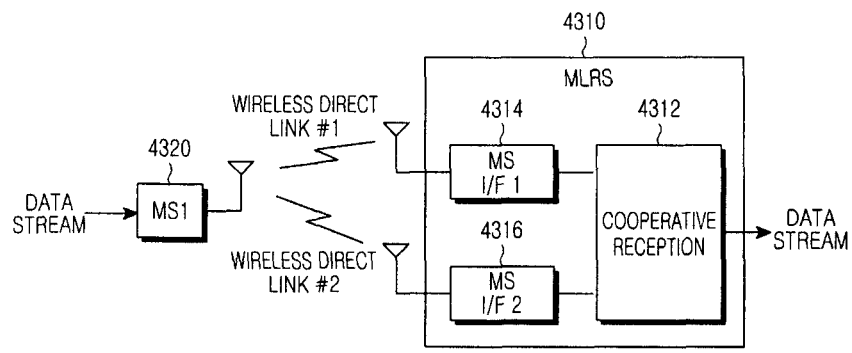
FIG. 43 shows an example of receiving signals from at least one MS connected through at least two MS I/F units by an MLRS in a cooperative manner according to an embodiment of the present invention.

FIG. 43 shows an example of receiving signals from each of at least one MS connected through at least two MS I/F units by an MLRS in a cooperative manner according to an embodiment of the present invention.

In this example, an MLRS cooperatively receives signals from each of at least one communication station connected to its at least two MS I/F units through associated multiple paths. The cooperative reception method may include Beamforming, Space Diversity, Simple Spatial Multiplexing, Postcoding, multi-user MIMO Detection, DPC Decoding, etc.

Referring to FIG. 43, an MLRS 4310 cooperatively receives signals from each of at least one MS 1 4320 connected to its at least two MS I/F units 4314 and 4316 through associated multiple wireless direct links. The MLRS 4310 may also cooperatively receive signals from each of at least two MSs connected to its at least two MS I/F units 4314 and 4316 through associated multiple wireless direct links. All or some of the at least two MS I/F units to which the at least two MSs are connected may be identical to or different from each other.

Finally, a description will be made of a handover method in a multi-path relay system according to an embodiment of the present invention.

Reference will be made to exemplary handover execution functions and handover procedures of an MLRS in a handover method according to an embodiment of the present invention. The handover execution functions of the MLRS include a handover decision function, a data buffering function, a multi-path based simultaneous transmission function, etc. The handover procedures are subdivided into a handover from a BS to an MLRS, a handover from an MLRS to a BS, a handover from a BS to an MLRS, including a resource request, and a handover from an MLRS to a BS, including a resource release, and will be described in separate embodiments.

A description will first be made of the handover execution functions of an MLRS according to an embodiment of the present invention. That is, reference will be made to a handover scenario based on an MLRS, in which an MS moves from coverage of the MLRS to coverage of another communication station in a multi-path relay system.

Figure 22:
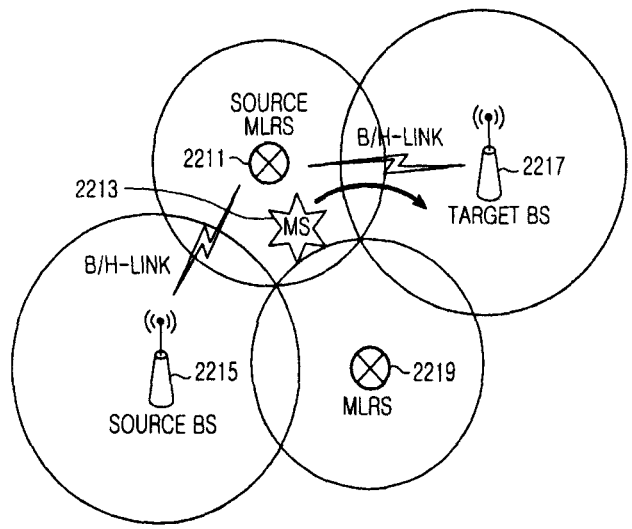
FIG. 22 schematically shows a handover scenario based on an MLRS, in which an MS moves from coverage of the MLRS to coverage of another communication station in a multi-path relay system according to an embodiment of the present invention.

FIG. 22 schematically shows a handover scenario based on an MLRS, in which an MS moves from coverage of the MLRS to coverage of another communication station in a multi-path relay system according to an embodiment of the present invention.

In the handover scenario described with reference to FIG. 22, when an MS moves from coverage of an MLRS to coverage of another communication station (i.e., considering mobile station), the MLRS directly decides whether to perform a handover of the MS based on measurement information received from the MS.

Referring to FIG. 22, a communication environment is considered in which an MS 2213 performs communication using a source MLRS 2211 that is connected to a source BS 2215 and a target BS 2217 via multiple backhaul links. It is assumed that in this communication environment, the MS 2213 that was located in coverage of the source MLRS 2211 and connected to the source MLRS 2211, moves to coverage of the target BS 2217.

In this case, the MS 2213 sends a Measurement Request (REQ) message to the source MLRS 2211. Upon receiving the Measurement REQ message, the source MLRS 2211 sends a Measurement Response (RSP) message to the MS 2213 in response to the Measurement REQ message.

Upon receiving the Measurement RSP message from the source MLRS 2211, the MS 2213 measures strength of a signal received from an adjacent BS, and then transmits the measured result to the source MLRS 2211 using a Received Signal Strength (RSS) Report message.

Based on the signal strength measurement result reported with the RSS Report message received from the MS 2213, the source MLRS 2211 directly decides whether to perform a handover for the MS 2213 and a handover path (i.e., a handover target communication station).

Figure 23:
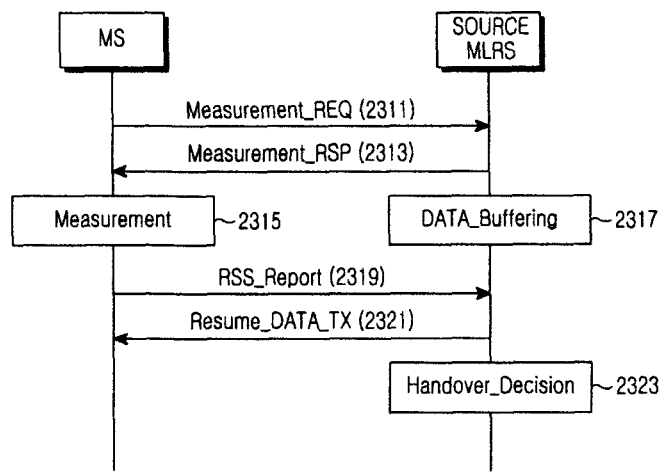
FIG. 23 shows a procedure for deciding a handover for an MS in a multi-path relay system according to an embodiment of the present invention.

FIG. 23 shows a procedure for deciding a handover for an MS in a multi-path relay system according to an embodiment of the present invention.

Referring to FIG. 23, an MS sends a Measurement REQ message to a source MLRS in step 2311. Upon receiving the Measurement REQ message, the source MLRS sends a Measurement RSP message to the MS in response to the Measurement REQ message in step 2313.

In step 2317, the source MLRS buffers data to be transmitted to the MS while the MS cannot receive data due to the handover procedure (e.g., while the MS measures signal strength). For example, when an MS moves from coverage of a source MLRS to coverage of another communication station, the source MLRS buffers data received from a source BS in order to transmit the data to the MS while the MS cannot receive data due to the handover procedure. The buffered data is to be transmitted to the MS before the handover procedure is completed.

Upon receiving the Measurement RSP message from the source MLRS, the MS measures strength of a signal received from an adjacent BS in step 2315. The MS transmits the measured result to the source MLRS using an RSS Report message in step 2319.

Upon receiving the RSS Report message from the MS, the source MLRS transmits the data it has buffered without transmitting to the MS, to MS in step 2321. The transmitting the buffered data is a mere example, and the time of transmitting the buffered data may be any time before the handover procedure is completed.

Based on the signal strength measurement result reported with the RSS Report message received from the MS, the source MLRS directly decides whether to perform a handover for the MS and a handover path (i.e., a handover target communication station) in step 2323.

In the above-described exemplary handover decision procedure, a source MLRS transmits data it has buffered, to an MS if an RSS report is received from the MS. However, the transmitting the buffered data at the time the RSS report is received from the MS is a mere example. As described above, it would be obvious that at any time before the handover procedure is completed, the source MLRS may transmit the data buffered up to that time, to the MS. Also, in the above exemplary handover decision procedure, the source MLRS directly decides whether to perform a handover of the MS and a handover path.

Figure 24:
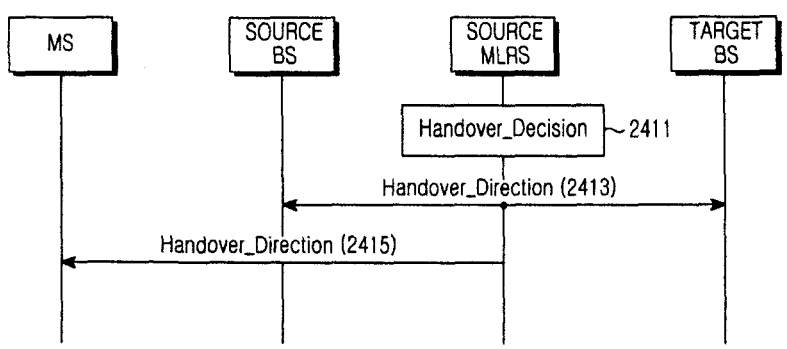
FIG. 24 shows a procedure for transmitting a decision result on a handover of an MS through multiple paths in a multi-path relay system according to an embodiment of the present invention.

FIG. 24 shows a procedure for transmitting a decision result on a handover of an MS through multiple paths in a multi-path relay system according to an embodiment of the present invention. In this example, an MLRS transmits information about handover paths it has decided, to a source communication station and a target communication station through multiple backhaul links corresponding to the multiple paths at the same time. It means that, instead of transmitting the handover decision information to the target communication station via the source communication station, the MLRS transmits the handover decision information directly to the two communication stations through multiple backhaul links. The source communication station and the target communication station may correspond to a source BS and a target BS, respectively.

Referring to FIG. 24, a source MLRS decides whether to perform a handover of an MS and a handover path in step 2411. If the source MLRS decides to perform a handover for the MS, it transmits information about the decided handover path to a source BS and a target BS through multiple backhaul links at the same time in step 2413. The information about the decided handover path includes information for indicating a change in a data transmission path of the MS from the source BS to the target BS.

The source MLRS transmits the information about the decided handover path to the MS in step 2415, in order to allow even the MS to recognize the change in its data transmission/reception path from the source BS to the target BS.

In the multi-path relay system according to an embodiment of the present invention, if it is decided to perform a handover for an MS based on the procedures described with reference to FIGS. 22 to 24, then a procedure for releasing (or withdrawing) the resource previously allocated for the MS and allocating a new resource to the MS is performed.

In an embodiment of the present invention described below, reference will be made to a procedure for releasing the existing resource and/or allocating a new resource using multiple backhaul links in a multi-path relay system. A communication station, to which the MS will move, transmits a resource request message or a resource release message to multiple communication stations connected through multiple backhaul links at the same time, for resource management with respect to a handover of the MS. It means that, instead of transmitting the resource request message or the resource release message to the target communication station via the source communication station, the MLRS transmits the messages directly to the two communication stations through multiple backhaul links.

Figure 25:
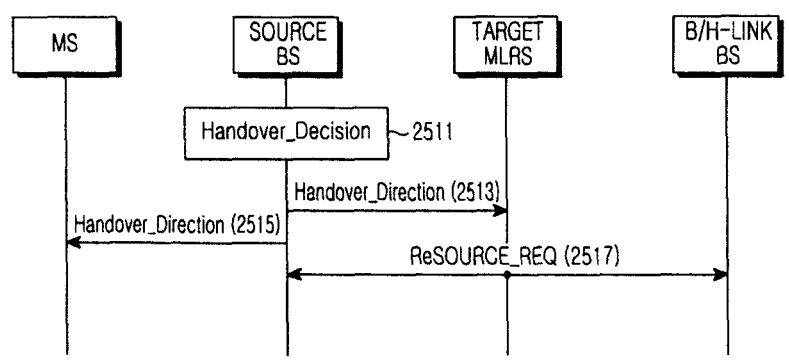
FIG. 25 shows a procedure for directly requesting allocation of a resource for a handover of an MS through multiple paths in a multi-path relay system according to an embodiment of the present invention.

FIG. 25 shows a procedure for directly requesting allocation of a resource for a handover of an MS through multiple paths in a multi-path relay system according to an embodiment of the present invention.

For example, it is assumed in FIG. 25 that an MS has moved from coverage of a source BS to coverage of a target MLRS. In this case, unlike in the procedure described in FIG. 24, the source BS may decide whether to perform a handover for an MS and a handover path. Information about the decided handover path is transmitted to the MS and the target MLRS by the source BS.

If the target MLRS cannot support a handover of the MS due to lack of resources, it sends a resource request message to multiple BSs connected through multiple backhaul links at the same time, in order to borrow resources from the multiple BSs connected through the multiple backhaul links. It means that, instead of sending the resource request message to a target communication station via a source communication station, the MLRS sends the message directly to the two communication stations through multiple backhaul links.

Referring to FIG. 25, a source BS decides whether to perform a handover of an MS and a handover path in step 2511. If the source BS decides to perform a handover for the MS, it transmits information about the decided handover path to a target MLRS using multiple backhaul links in step 2513. The source MLRS transmits the information about the decided handover path to the MS in step 2515. The information about the decided handover path includes information for indicating a change in a data transmission path of the MS from the source BS to the target MLRS.

Upon receiving the information about the handover path from the source BS, the target MLRS sends a resource request message to multiple paths at the same time using multiple backhaul links in step 2517. The resource request message is simultaneously sent to at least one BS including the source BS connected through the multiple backhaul links. It means that, instead of sending the resource request message to a target communication station via a source communication station, the MLRS sends the message directly to the two communication stations through multiple backhaul links.

Figure 26:
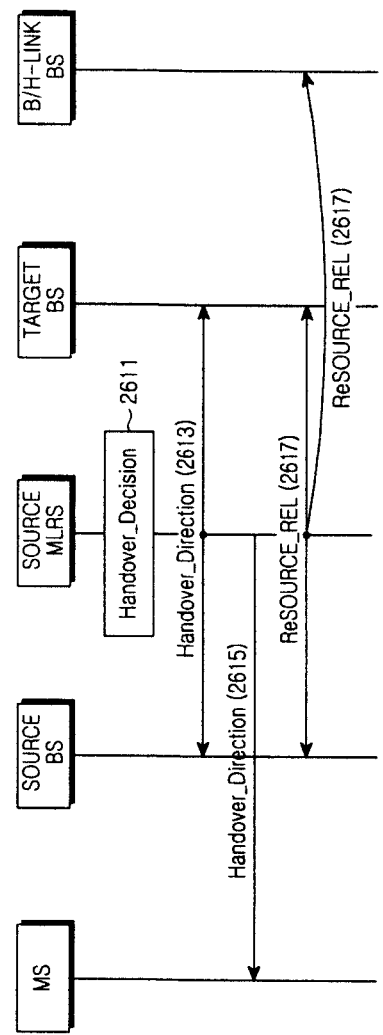
FIG. 26 shows a procedure for directly sending a release of a resource for a handover of an MS through multiple paths in a multi-path relay system according to an embodiment of the present invention.

FIG. 26 shows a procedure for directly sending a release of a resource for a handover of an MS through multiple paths in a multi-path relay system according to an embodiment of the present invention. That is, if an MS has moved from coverage of a source MLRS to coverage of another communication station, a resource release message for requesting release of the resource allocated to the MS is sent to multiple communication stations connected through multiple backhaul links at the same time. It means that, instead of sending the resource release message to a source communication station via a target communication station, the MLRS sends the message directly to the two communication stations through multiple backhaul links.

Referring to FIG. 26, a source MLRS decides whether to perform a handover of an MS and a handover path in step 2611. If the source MLRS decides to perform a handover for the MS, it transmits information about the decided handover path to a source BS and a target BS at the same time using multiple backhaul links in step 2613. The information about the decided handover path includes information for indicating a change in a data transmission path of the MS from the source BS to the target BS.

The source MLRS transmits the information about the decided handover path to the MS in step 2615, in order to allow even the MS to recognize the change in its data transmission/reception path from the source BS to the target BS.

Thereafter, in order to release the resource that the MS has used, the source MLRS sends a resource release message to at least two BSs connected through multiple backhaul links through multiple paths at the same time in steps 2617 and 2619. It means that, instead of sending the resource release message to a source communication station via a target communication station, the MLRS sends the message directly to the two communication stations through multiple backhaul links. The at least two BSs include the source BS and the target BS.

Next, reference will be made to a variety of examples of the handover procedure according to an embodiment of the present invention.

Figure 27:
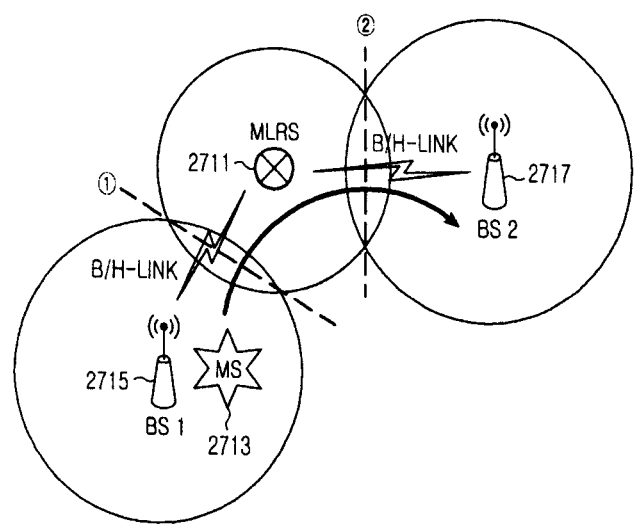
FIG. 27 shows an exemplary handover scenario based on an MLRS according to an embodiment of the present invention.

FIG. 27 shows an exemplary handover scenario based on an MLRS according to an embodiment of the present invention.

In the scenario shown in FIG. 27, it is assumed that an MS 2713 moves from coverage of a source BS 2715 to coverage of a target BS 2717 via coverage of an MLRS 2711. In this scenario, two handovers occur. That is, a first handover is a handover between the source BS 2715 and the MLRS 2711, and a second handover is a handover between the MLRS 2711 and the target BS 2717.

A detailed procedure for each handover regarding the scenario shown in FIG. 27 will be described in detail below with reference to FIGS. 28 to 31.

In the following description, the handover procedure will be subdivided into a handover from a BS to an MLRS (① in FIG. 27), a handover from an MLRS to a BS (① in FIG. 27), a handover from a BS to an MLRS (② in FIG. 27), including a resource request, and a handover from an MLRS to a BS (② in FIG. 27), including a resource release, and then described in separate embodiments.

Figure 28:
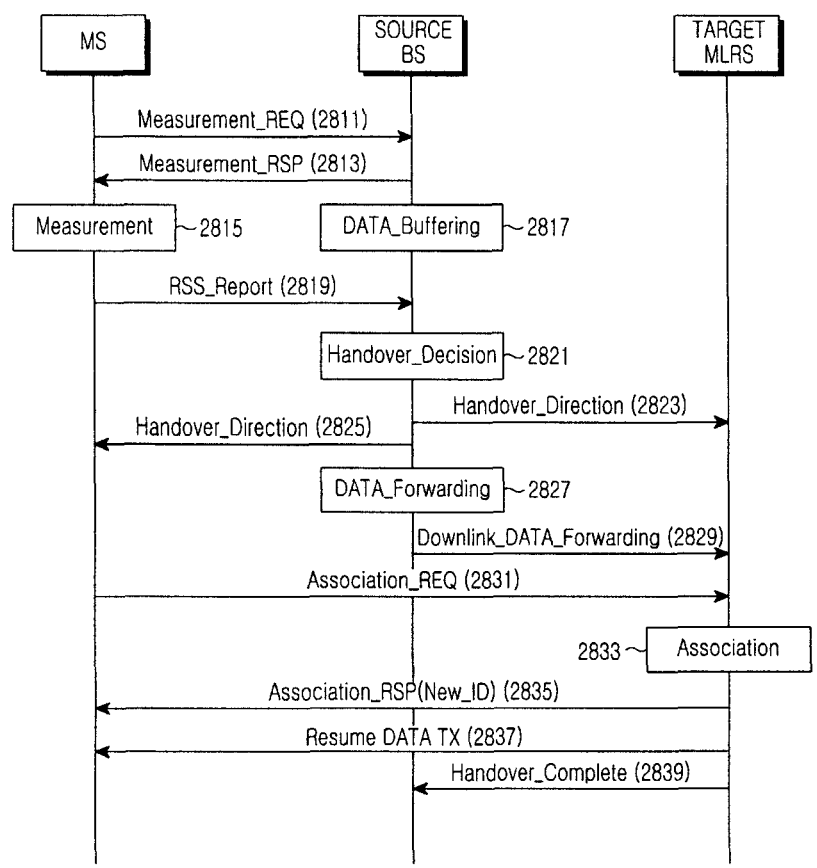
FIG. 28 shows a handover procedure from a source BS to an MLRS in a multi-path relay system according to an embodiment of the present invention.

FIG. 28 shows a handover procedure from a source BS to an MLRS in a multi-path relay system according to an embodiment of the present invention.

Referring to FIG. 28, if strength of a signal from a source BS is lower than a preset value, an MS sends a Measurement REQ message to the source BS in step 2811. The decrease in strength of a signal from the source BS may occur as the MS moves from coverage of the source BS to coverage of a target MLRS. Unlike this, the MS may send the Measurement REQ message to the source BS by periods of a preset time.

Upon receiving the Measurement REQ message, the source BS sends a Measurement RSP message to the MS in response to the Measurement REQ message in step 2813. The Measurement RSP message may carry parameters the MS requires to perform measurement.

The parameters the MS needs in order to perform measurement may include a list of measurement target communication stations, a measurement time, a measurement method, a measurement priority, etc. The measurement method includes information for determining whether to continuously perform measurement within a preset time, or to periodically perform measurement, and the measurement priority includes information designating communication stations having a priority in the measurement.

In step 2817, the source BS buffers data to be transmitted to the MS while the MS cannot receive data due to the handover procedure (e.g., while the MS measures signal strength).

Upon receiving the Measurement RSP message from the source BS, the MS measures strength of a signal received from an adjacent BS in step 2815, and sends the measured result to the source BS using an RSS Report message in step 2819.

Upon receiving the RSS Report message from the MS, the source BS directly decides in step 2821 whether to perform a handover for the MS and a handover path (i.e., a handover target communication station) based on the signal strength measurement result reported with the received RSS Report message.

If the source BS decides to perform a handover for the MS, it sends a Handover Direction message with information about the decided handover path to a target MLRS using multiple backhaul links in step 2823. The information about the decided handover path includes information for indicating the change in a data transmission path of the MS from the source BS to the target MLRS.

In step 2825, the source BS transmits the information about the decided handover path to the MS, in order to allow even the MS to recognize the change in its data transmission/reception path from the source BS to the target MLRS.

The source BS forwards the data it has buffered without transmitting to the MS, to the MS in step 2827, and forwards the data it has buffered to the target MLRS in step 2829. The forwarding the buffered data is a mere example, and the time of forwarding the buffered data may be any time before the handover procedure is completed.

In order to perform association with the target MLRS, the MS sends an Association_REQ message to the target MLRS in step 2831. Upon receiving the Association_REQ message, the target MLRS performs an association operation with the MS in step 2833. If the association with the MS is achieved, the target MLRS sends an Association_RSP message with a new Identifier (ID) assigned according to the association, to the MS in step 2835.

If the data buffered by the source BS has not been forwarded to the MS, the target MLRS transmits the data received from the source BS to the MS in step 2837. The target MLRS sends a Handover_Complete message to the source BS in step 2839, completing the handover process of the MS.

Figure 29:
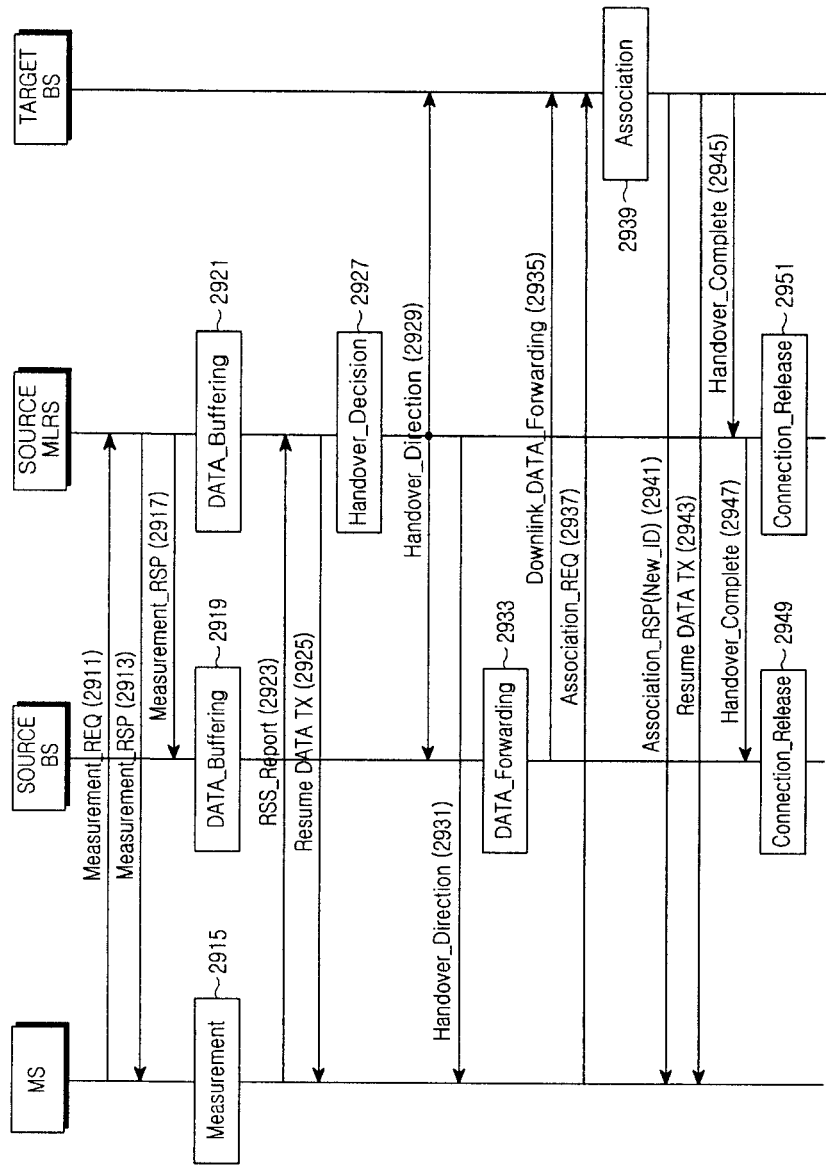
FIG. 29 shows a handover procedure from an MLRS to a target BS in a multi-path relay system according to an embodiment of the present invention.

FIG. 29 shows a handover procedure from an MLRS to a target BS in a multi-path relay system according to an embodiment of the present invention.

Referring to FIG. 29, if strength of a signal from a source MLRS is lower than a preset value, an MS sends a Measurement REQ message to the source MLRS in step 2911. The decrease in strength of a signal from the source MLRS may occur as the MS moves from coverage of the source MLRS to coverage of a target BS. Unlike this, the MS may send the Measurement REQ message to the source MLRS by periods of a preset time.

Upon receiving the Measurement REQ message, the source MLRS sends a Measurement RSP message to the MS in response to the Measurement REQ message in step 2913. The Measurement RSP message may carry parameters the MS requires to perform measurement.

The parameters the MS needs in order to perform measurement may include a list of measurement target communication stations, a measurement time, a measurement method, a measurement priority, etc. The measurement method includes information for determining whether to continuously perform measurement within a preset time, or to periodically perform measurement, and the measurement priority includes information designating communication stations having a priority in the measurement.

Upon receiving the Measurement RSP message from the source MLRS, the MS measures strength of a signal received from an adjacent BS in step 2915, and transmits the measured result to the source MLRS using an RSS Report message in step 2923.

In step 2917, the source MLRS sends the Measurement RSP message even to a source BS. Then the source BS buffers data to be transmitted to the MS while the MS cannot receive data due to the handover procedure (e.g., while the MS measures signal strength) in step 2919.

As another example, the source MLRS may directly buffer data to be transmitted to the MS while the MS cannot receive data due to the handover procedure (e.g., while the MS measures signal strength) in step 2921.

Upon receiving the RSS Report message from the MS, the source MLRS transmits the data it has buffered without transmitting to the MS, to the MS in step 2925. The transmitting the buffered data is a mere example, and the time of transmitting the buffered data may be any time before the handover procedure is completed.

The source MLRS directly decides whether to perform a handover for the MS and a handover path (i.e., a handover target communication station) based on the signal strength measurement result reported by the received RSS Report message in step 2927.

If the source MLRS decides to perform a handover for the MS, it sends a Handover Direction message with information about the decided handover path to the source BS and a target BS at the same time using multiple backhaul links in step 2929. The information about the decided handover path includes information for indicating the change in a data transmission path of the MS from the source MLRS to the target MLRS.

In step 2931, the source MLRS sends a Handover Direction message with the information about the decided handover path even to the MS, in order to allow even the MS to recognize the change in its data transmission/reception path from the source MLRS to the target BS.

Upon receiving the Handover Direction message from the source MLRS, the source BS forwards the buffered data in step 2933. For this, the source BS transmits the buffered data to the target BS in step 2935.

In order to perform association with the target BS, the MS sends an Association_REQ message to the target BS in step 2937. Upon receiving the Association_REQ message, the target BS performs an association operation with the MS in step 2939. If the association operation with the MS is achieved, the target BS sends an Association_RSP message with a new ID assigned according to the association to the MS in step 2941.

The target BS forwards the data provided from the source BS to the MS in step 2943. Further, the target BS sends a Handover_Complete message to the source MLRS in step 2945 so that the source MLRS may perform necessary procedures including release of the resource allocated for the MS. The source MLRS also sends a Handover_Complete message to the source BS in step 2947 so that the source BS may perform necessary procedures including release of the resource allocated for the MS.

Hence, the source BS and the source MLRS cut off their connections to the MS in steps 2949 and 2951, respectively, completing the handover procedure for the MS.

Figure 30:
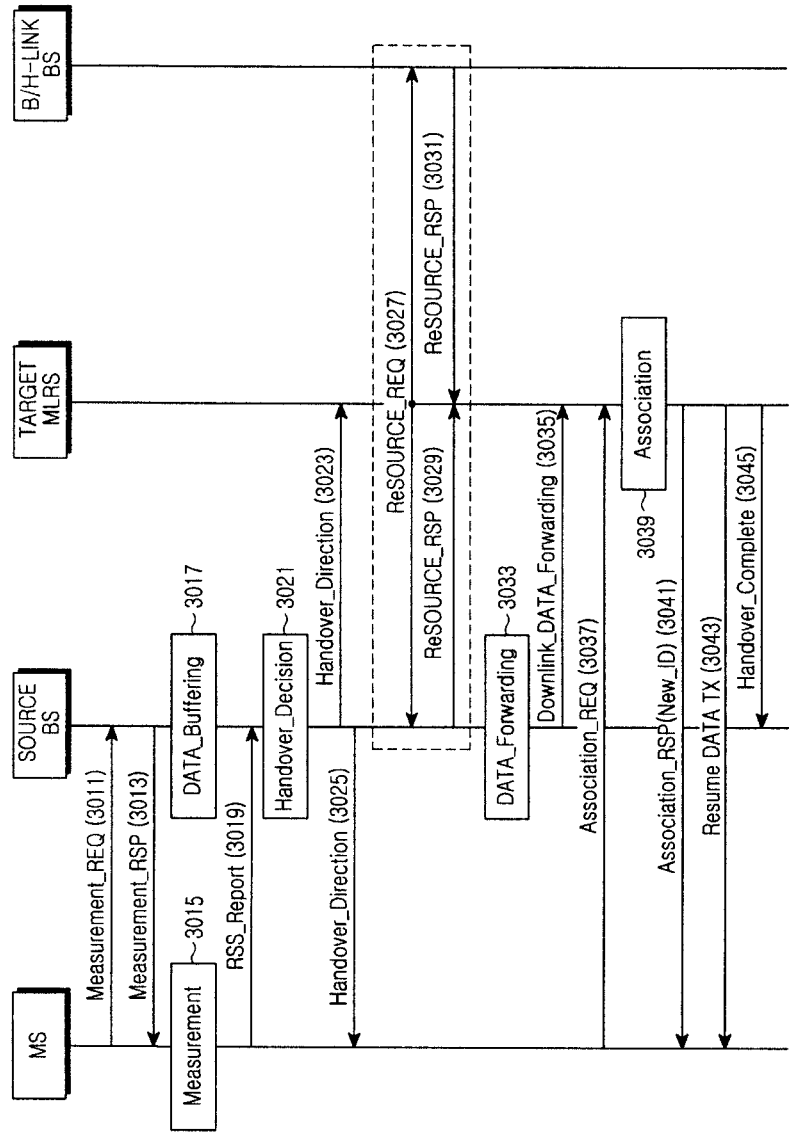
FIG. 30 shows a handover procedure from a source BS to an MLRS, including a resource request, in a multi-path relay system according to an embodiment of the present invention.

FIG. 30 shows a handover procedure from a source BS to an MLRS, including a resource request, in a multi-path relay system according to an embodiment of the present invention.

Referring to FIG. 30, if strength of a signal from a source BS is lower than a preset value, an MS sends a Measurement REQ message to the source BS in step 3011. The decrease in strength of a signal from the source BS may occur as the MS moves from coverage of the source BS to coverage of a target MLRS. Unlike this, the MS may send the Measurement REQ message to the source BS by periods of a preset time.

Upon receiving the Measurement REQ message, the source BS sends a Measurement RSP message to the MS in response to the Measurement REQ message in step 3013. The Measurement RSP message may carry parameters the MS requires to perform measurement.

The parameters the MS needs in order to perform measurement may include a list of measurement target communication stations, a measurement time, a measurement method, a measurement priority, etc. The measurement method includes information for determining whether to continuously perform measurement within a preset time, or to periodically perform measurement, and the measurement priority includes information designating communication stations having a priority in the measurement.

The source BS buffers data to be transmitted to the MS while the MS cannot receive data due to the handover procedure (e.g., while the MS measures signal strength) in step 3017.

Upon receiving the Measurement RSP message from the source BS, the MS measures strength of a signal received from an adjacent BS in step 3015, and transmits the measured result to the source BS using an RSS Report message in step 3019.

Upon receiving the RSS Report message from the MS, the source BS directly decides whether to perform a handover for the MS and a handover path (i.e., a handover target communication station) based on the signal strength measurement result reported by the received RSS Report message in step 3021.

If the source BS decides to perform a handover for the MS, it sends a Handover Direction message with information about the decided handover path to a target MLRS using multiple backhaul links in step 3023. The information about the decided handover path includes information for indicating the change in a data transmission path of the MS from the source BS to the target MLRS.

The source BS transmits information about the decided handover path to the MS using a Handover Direction message in step 3025, in order to allow even the MS to recognize the change in its data transmission/reception path from the source BS to the target MLRS.

In step 3027, the target MLRS sends a resource request message to all BSs connected via multiple backhaul links trough multiple paths at the same time using the multiple backhaul links in order to borrow resources.

All BSs receiving the resource request message from the target MLRS decide whether they can lend resources, and send a resource response message with information about their resource lend ability to the target MLRS in response to the resource request message in steps 3029 and 3031.

On the contrary, by giving priority to the resource request of the target MLRS, it is also possible to allow all BSs connected to the target MLRS through multiple backhaul links to lend the requested resources unconditionally. In this case, it is not necessary for all the BSs connected through multiple backhaul links to send the resource response message to the target MLRS.

The source BS forwards the data it has buffered without transmitting to the MS, to the MS in step 3033, and forwards the buffered data to the target MLRS in step 3035. The forwarding the buffered data is a mere example, and the time of forwarding the buffered data may be any time before the handover procedure is completed.

To perform association with the target MLRS, the MS sends an Association_REQ message to the target MLRS in step 3037. Upon receiving the Association_REQ message, the target MLRS performs an association operation with the MS in step 3039. If the association with the MS is achieved, the target MLRS sends an Association_RSP message with a new ID assigned according to the association to the MS in step 3041.

If the data buffered by the source BS has not been forwarded to the MS, the target MLRS transmits the data received from the source BS to the MS in step 3043, and then sends a Handover_Complete message to the source BS in step 3045, completing the handover process of the MS.

Figure 31:
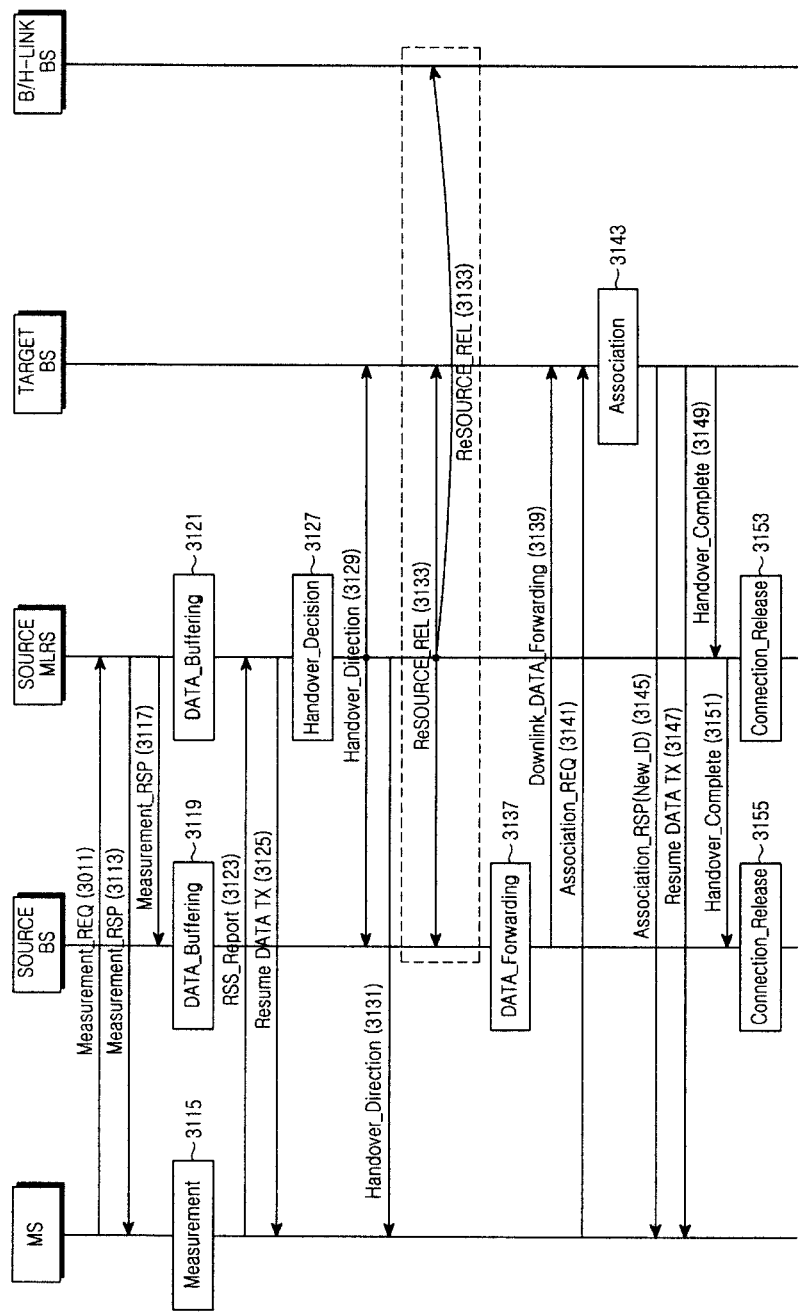
FIG. 31 shows a handover procedure from an MLRS to a target BS, including a resource release, in a multi-path relay system according to an embodiment of the present invention.

FIG. 31 shows a handover procedure from an MLRS to a target BS, including a resource release, in a multi-path relay system according to an embodiment of the present invention.

Referring to FIG. 31, if strength of a signal from a source MLRS is lower than a preset value, an MS sends a Measurement REQ message to the source MLRS in step 3111. The decrease in strength of a signal from the source MLRS may occur as the MS moves from coverage of the source MLRS to coverage of a target BS. Unlike this, the MS may send the Measurement REQ message to the source MLRS by periods of a preset time.

Upon receiving the Measurement REQ message, the source MLRS sends a Measurement RSP message to the MS in response to the Measurement REQ message in step 3113. The Measurement RSP message may carry parameters the MS requires to perform measurement.

The parameters the MS needs in order to perform measurement may include a list of measurement target communication stations, a measurement time, a measurement method, a measurement priority, etc. The measurement method includes information for determining whether to continuously perform measurement within a preset time, or to periodically perform measurement, and the measurement priority includes information designating communication stations having a priority in the measurement.

Upon receiving the Measurement RSP message from the source MLRS, the MS measures strength of a signal received from an adjacent BS in step 3115, and then transmits the measured result to the source MLRS using an RSS Report message in step 3123.

The source MLRS may send the Measurement RSP message even to the source BS in step 3117. Then the source BS buffers data to be transmitted to the MS while the MS cannot receive data due to the handover procedure (e.g., while the MS measures signal strength) in step 3119.

As another example, the source MLRS may directly buffer data to be transmitted to the MS while the MS cannot receive data due to the handover procedure (e.g., while the MS measures signal strength) in step 3121.

Upon receiving the RSS Report message from the MS, the source MLRS transmits the data it has buffered without transmitting to the MS, to the MS in step 3125. The transmitting the buffered data is a mere example, and the time of transmitting the buffered data may be any time before the handover procedure is completed.

In step 3127, the source MLRS directly decides whether to perform a handover for the MS and a handover path (i.e., a handover target communication station) based on the signal strength measurement result reported by the received RSS Report message.

If the source MLRS decides to perform a handover for the MS, it sends a Handover Direction message with information about the decided handover path to the source BS and a target BS at the same time using multiple backhaul links in step 3129. The information about the decided handover path includes information for indicating the change in a data transmission path of the MS from the source MLRS to the target BS.

The source MLRS sends the Handover Direction message with the information about the decided handover path even to the MS in step 3131, in order to allow even the MS to recognize the change in its data transmission/reception path from the source MLRS to the target BS.

In order to release resources borrowed from all BSs connected through multiple backhaul links, the source MLRS sends a resource release message to the BSs through multiple paths at the same time using the multiple backhaul links in step 3133, and then releases the resources it has borrowed from all BSs connected through the multiple backhaul links in step 3135.

The source BS forwards the buffered data in step 3137. For this, the source BS transmits the buffered data to the target BS in step 3139.

In order to perform association with the target BS, the MS sends an Association_REQ message to the target BS in step 3141. Upon receiving the Association_REQ message, the target BS performs an operation for association with the MS in step 3143. If the association with the MS is achieved, the target BS sends an Association_RSP message with a new ID assigned according to the association to the MS in step 3145.

The target BS transmits the data provided from the source BS to the MS in step 3147, and then sends a Handover_Complete message to the source MLRS in step 3149 so that the source MLRS may perform necessary procedures including release of the resource allocated for the MS. The source MLRS also sends a Handover_ Complete message to the source BS in step 3151 so that the source BS may perform necessary procedures including release of the resource allocated for the MS.

Hence, the source MLRS and the source BS cut off their connections to the MS in steps 3153 and 3155, respectively, completing the handover procedure for the MS.

As is apparent from the foregoing description, in a multi-path relay system according to an embodiment of the present invention, at least two adjacent communication stations may share resources allocated to an MLRS, and the MLRS may perform a handover procedure of a preset level, facilitating efficient inter-cell handover.

The present invention enables efficient transmission/reception of control data and/or user data between an MLRS and multiple BSs, multiple RSs or at least one MS using multiple backhaul links and/or multiple wireless direct links. Many other effects of the present invention have been described explicitly or implicitly in the foregoing description.

While the invention has been shown and described with reference to certain exemplary embodiments thereof, it will be understood by those skilled in the art that various changes in form and details may be made therein without departing from the spirit and scope of the invention as defined by the appended claims and their equivalents.

For example, the above-described MLRS-based handover procedures are mere examples, and various other handover procedures may be considered, including a handover decision function, a data buffering function and a multi-path based simultaneous transmission function of the MLRS.

The invention claimed is:

1. A Multi-Link Relay Station (MLRS) in a communication system, adapted to perform a multi-path control to provide a communication service through at least two independent backhaul links connecting simultaneously at least two communication stations,
wherein the MLRS comprises at least one backhaul interface unit and at least one Mobile Station (MS) interface unit, and the MLRS forms the at least two independent backhaul links by allowing the at least two communication stations to share at least one backhaul interface unit, allowing the at least two communication stations to use independent backhaul interface units, or allowing each of the at least two communication stations to use at least two backhaul interface units.

2. The MLRS of claim 1, wherein the MLRS forms multiple wireless direct links by allowing at least two communication stations to share at least one MS interface unit, allowing at least two communication stations to use independent MS interface units, or allowing each of at least one communication station to use at least two MS interface units.

3. The MLRS of claim 1, wherein in performing the multi-path control, the MLRS controls at least one path for communication with at least two communication stations.

4. The MLRS of claim 3, wherein in controlling the at least one path for communication with the at least two communication stations, the MLRS performs resource management independently of at least one communication station connected through at least one backhaul link.

5. The MLRS of claim 3, wherein in controlling the at least one path for communication with the at least two communication stations, the MLRS forms multiple backhaul links to the at least two communication stations by means of the multi-path control:
by allocating resources to one set of communication stations such that the one set of communication stations share at least one resource,
by allocating resources to each of at least one other set of communication stations such that the at least one other set of communication stations share at least one other resource, and
by allocating resources such that at least one uplink set is identical to or different from at least one downlink set.

6. The MLRS of claim 1, wherein in performing the multi-path control, the MLRS performs at least one of a control operation including path search, path selection, path connection including resource allocation, path release, and a path change including resource addition and resource release to provide a communication service.

7. The MLRS of claim 1, wherein the multi-path control comprises at least one of a connection control function, a multi-homing control function, a cooperative transmission control function, and a handover control function.

8. The MLRS of claim 7, wherein the MLRS receives same or different data streams from each of at least two communication stations through multiple paths formed by multiple backhaul links, combines the data streams received from each of the at least two communication stations, and transmits the combined data stream to at least one other communication station, by means of the multi-homing control function, or the MLRS receives data stream from at least one communication station, transmits same or different data stream to each of at least two communication stations through multiple paths formed by multiple backhaul links using the received data stream, by means of the multi-homing control function.

9. The MLRS of claim 7, wherein the MLRS transmits same or different data streams to at least one communication station through multiple paths formed using at least two MS interface units, by means of the multi-homing control function, or the MLRS receives same or different data streams from at least one communication station through multiple paths formed using at least two MS interface units, by means of the multi-homing control function.

10. The MLRS of claim 7, wherein the MLRS cooperatively transmits signals to at least one communication station connected through at least two backhaul interface units, cooperatively receives signals from at least one communication station connected through at least two backhaul interface units, cooperatively transmits signals to at least one communication station connected through at least two MS interface units, or cooperatively receives signals from at least one communication station connected through at least two MS interface units, by means of the cooperative transmission control function.

11. The MLRS of claim 7, wherein the MLRS decides whether to perform a handover for a considering mobile station and at least one handover target communication station by means of the handover control function based on measurement information received from the considering mobile station, or the MLRS buffers some data to be transmitted to a considering mobile station due to a handover for the considering mobile station, by means of the handover control function, or the MLRS directly transmits/receives handover control messages generated by the handover control function with associated source and target communication stations through multiple paths formed by multiple backhaul links.

12. A method of performing a multi-path control in a communication system by providing a communication service through at least two independent backhaul links connecting simultaneously at least two communication stations,
wherein at least one backhaul interface unit and at least one Mobile Station (MS) interface unit are used for the multi-path control, and the at least two independent backhaul links are formed by allowing the at least two communication stations to share at least one backhaul interface unit, allowing the at least two communication stations to use independent backhaul interface units, or allowing each of the at least two communication stations to use at least two backhaul interface units.

13. The method of claim 12, wherein multiple wireless direct links are formed by allowing at least two communication stations to share at least one MS interface unit, allowing at least two communication stations to use independent MS interface units, or allowing each of at least one communication station to use at least two MS interface units.

14. The method of claim 12, wherein the performing the multi-path control comprises controlling at least one path for communication with at least two communication stations.

15. The method of claim 14, wherein the controlling the at least one path for communication with the at least two communication stations comprises performing resource management independently of at least one communication station connected through at least one backhaul link.

16. The method of claim 14, wherein the controlling the at least one path for communication with the at least two communication stations comprises forming multiple backhaul links to the at least two communication stations by means of the multi-path control by allocating resources to one set of communication stations such that the one set of communication stations share at least one resource, by allocating resources to each of at least one other set of communication stations such that the at least one other set of communication stations share at least one other resource, and by allocating resources such that at least one uplink set is identical to or different from at least one downlink set.

17. The method of claim 12, wherein the multi-path control comprises at least one of a connection control function, a multi-homing control function, a cooperative transmission control function, and a handover control function.

18. The method of claim 17, wherein the multi-path control comprises receiving same or different data streams from each of at least two communication stations through multiple paths formed by multiple backhaul links, combining the data streams received from each of the at least two communication stations, and transmitting the combined data stream to at least one other communication station, by means of the multi-homing control function, or the multi-path control comprises receiving data stream from at least one communication station, transmitting same or different data stream to each of at least two communication stations through multiple paths formed by multiple backhaul links using the received data stream, by means of the multi- homing control function.

19. The method of claim 17, wherein the multi-path control comprises transmitting same or different data streams to at least one communication station through multiple paths formed using at least two MS interface units, by means of the multi-homing control function, or the multi-path control comprises receiving same or different data streams from at least one communication station through multiple paths formed using at least two MS interface units, by means of the multi- homing control function.

20. The method of claim 17, wherein the multi-path control comprises deciding whether to perform a handover for a considering mobile station and at least one handover target communication station based on measurement information received from the considering mobile station by means of the handover control function, or the multi-path control comprises buffering some data to be transmitted to a considering mobile station due to a handover for the considering mobile station, by means of the handover control function, or the multi-path control comprises directly transmitting/receiving handover control messages generated by the handover control function with associated source and target communication stations through multiple paths formed by multiple backhaul links.

* * * * *